April 1, 1941.   W. J. FINNEGAN   2,237,257
METHOD AND APPARATUS FOR RAPID REFRIGERATING AND HANDLING OF FOODS
Filed Feb. 1, 1939   12 Sheets-Sheet 1
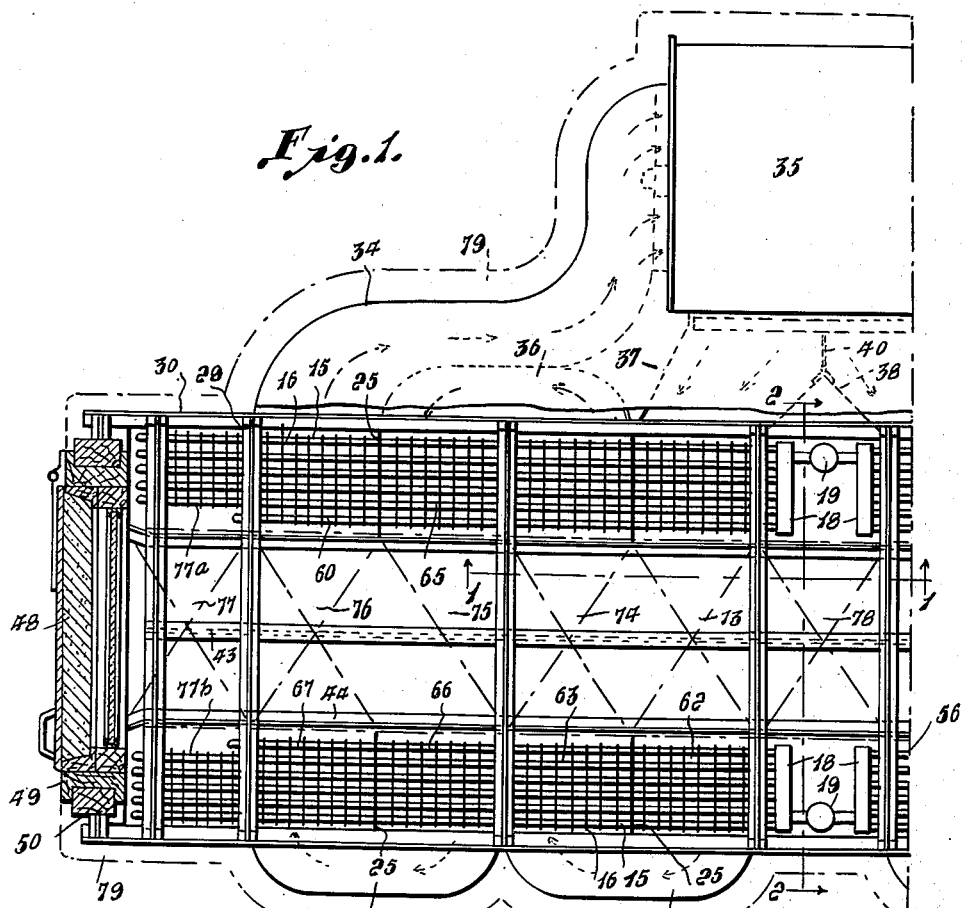
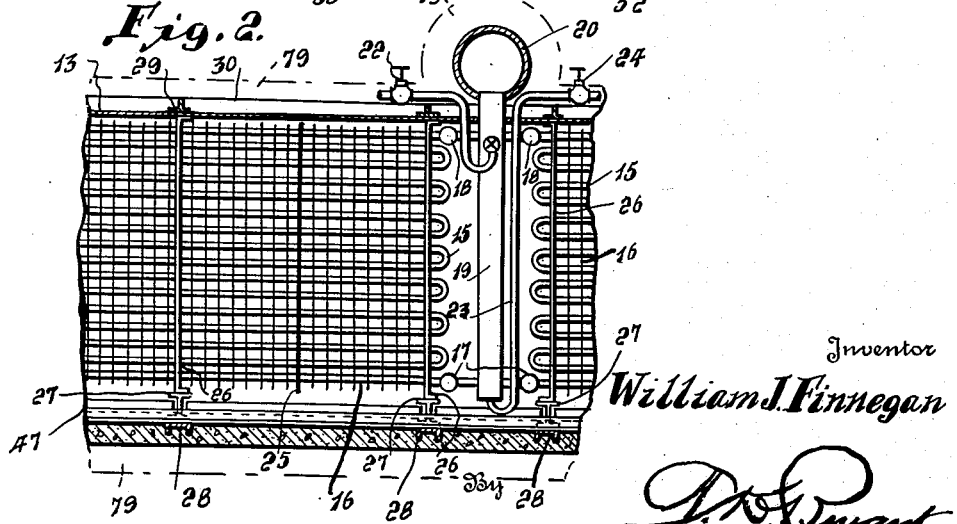
Inventor
William J. Finnegan
By D. D. Pryant
Attorney.

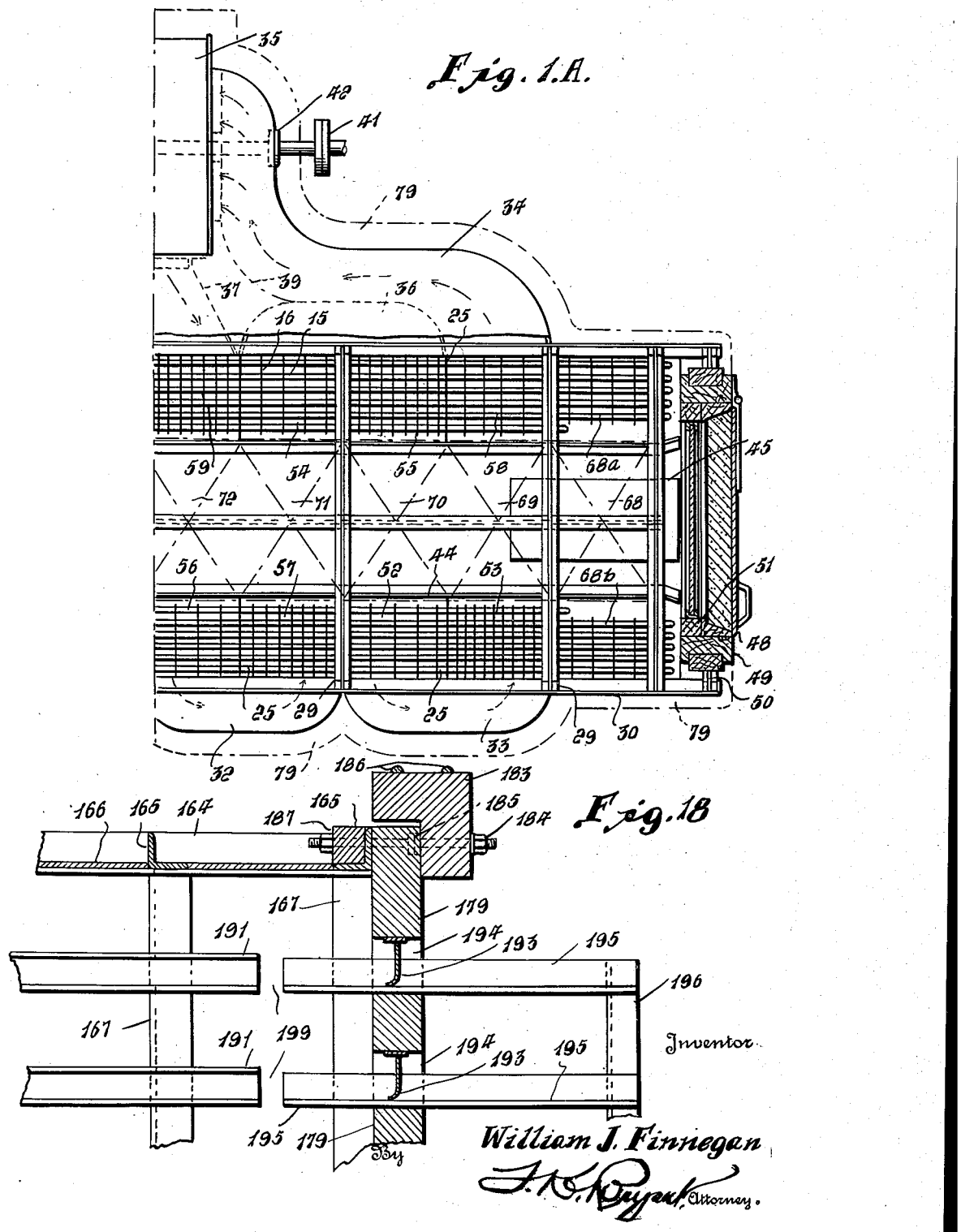

April 1, 1941. W. J. FINNEGAN 2,237,257
METHOD AND APPARATUS FOR RAPID REFRIGERATING AND HANDLING OF FOODS
Filed Feb. 1, 1939 12 Sheets-Sheet 3

Inventor
William J. Finnegan

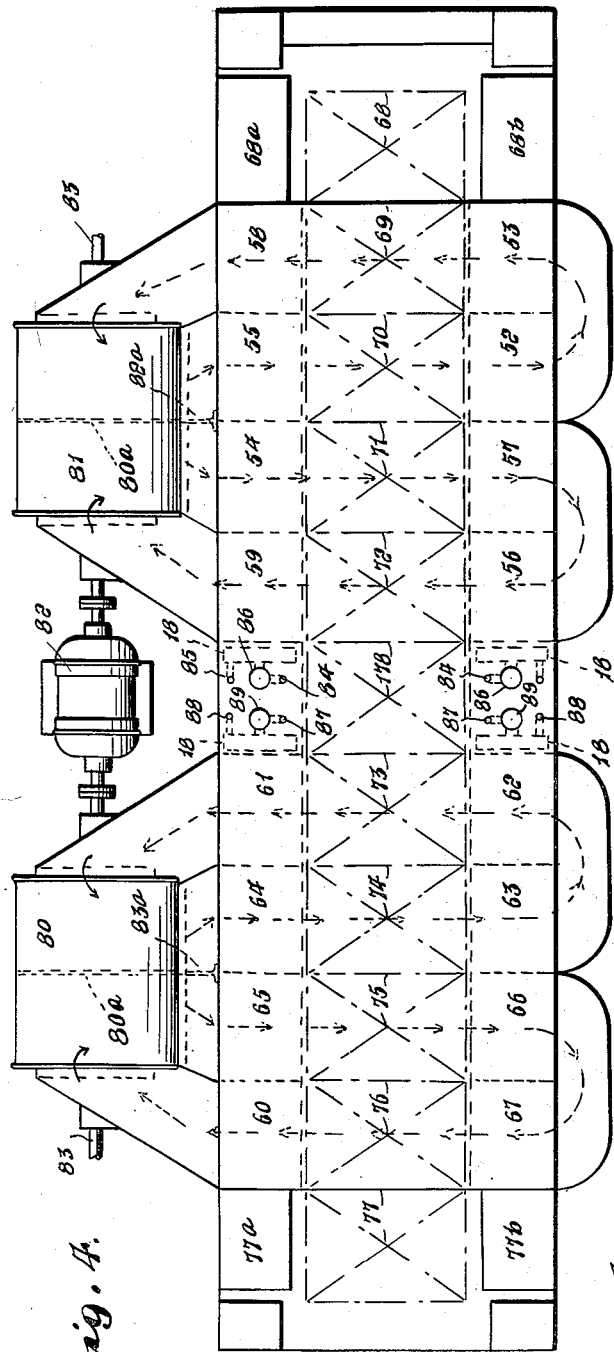

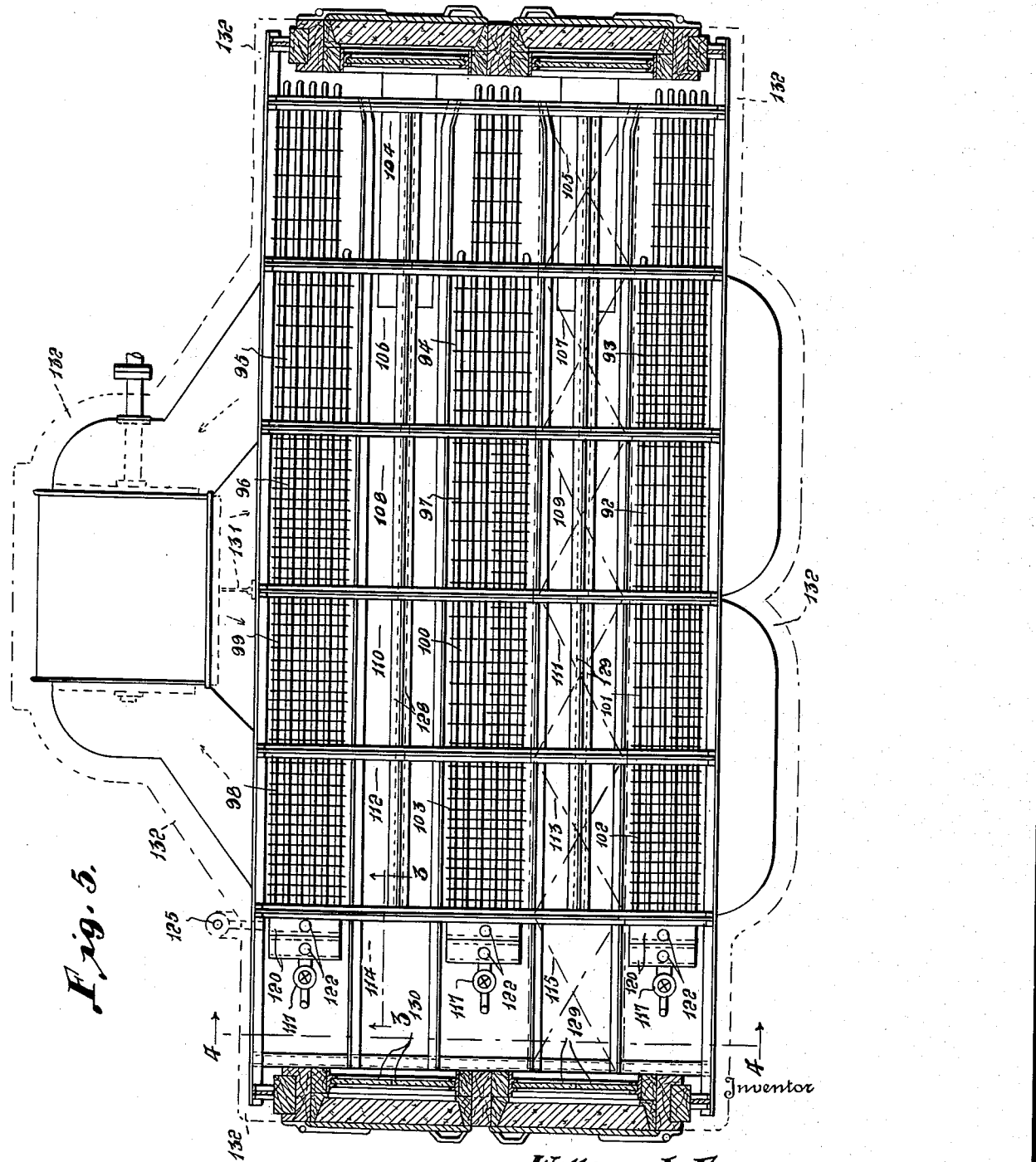

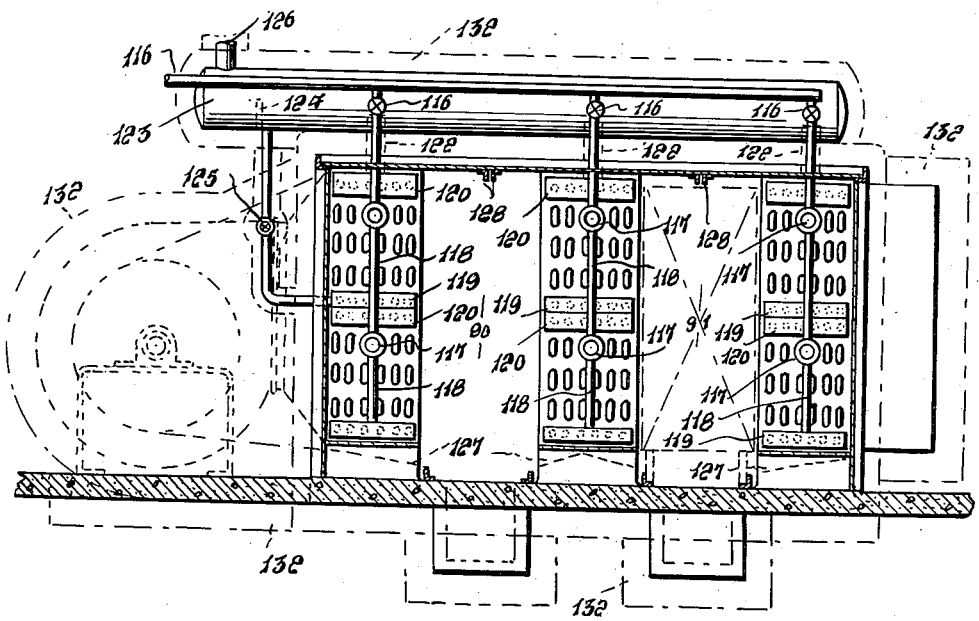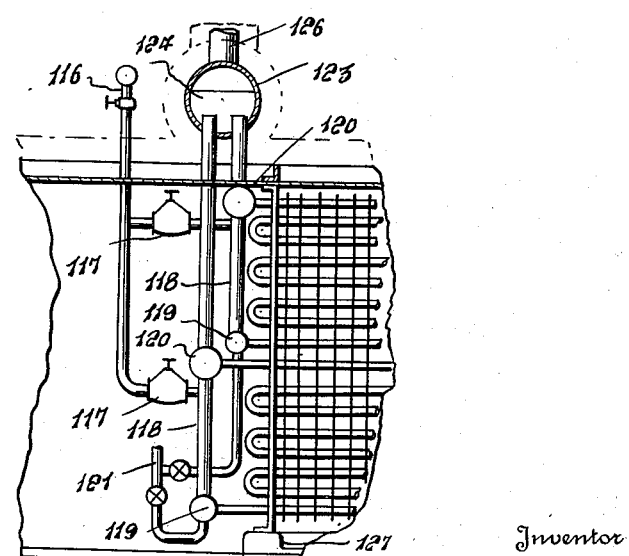

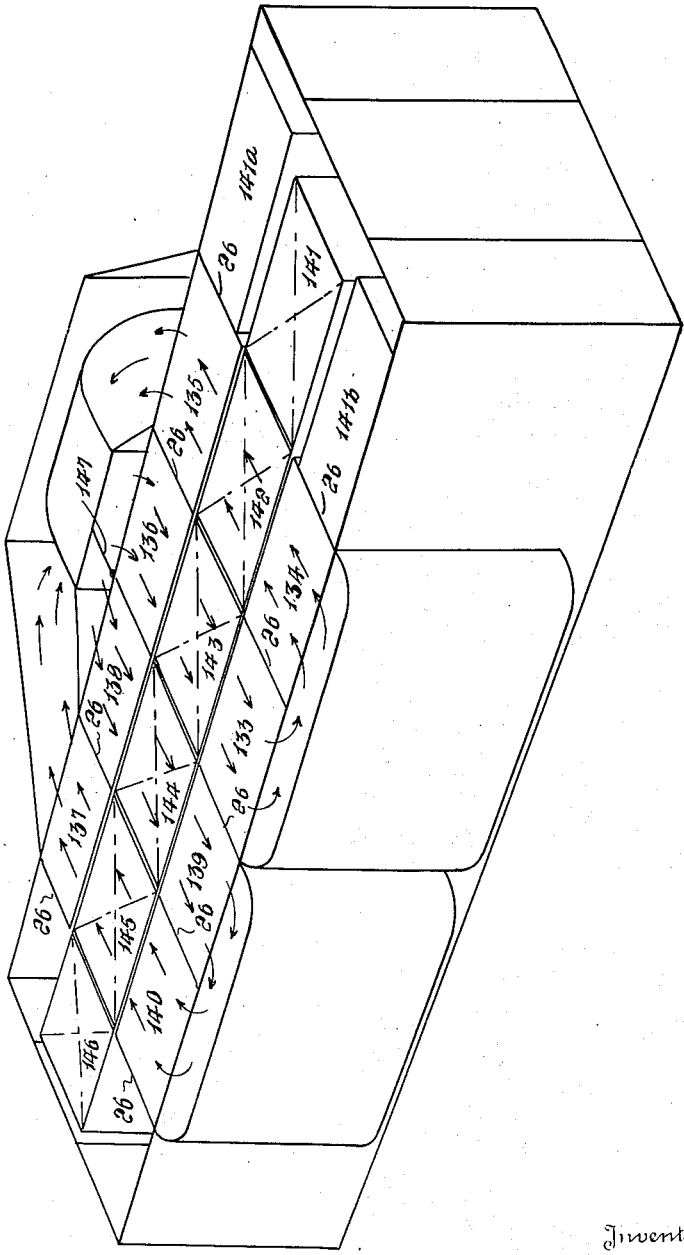

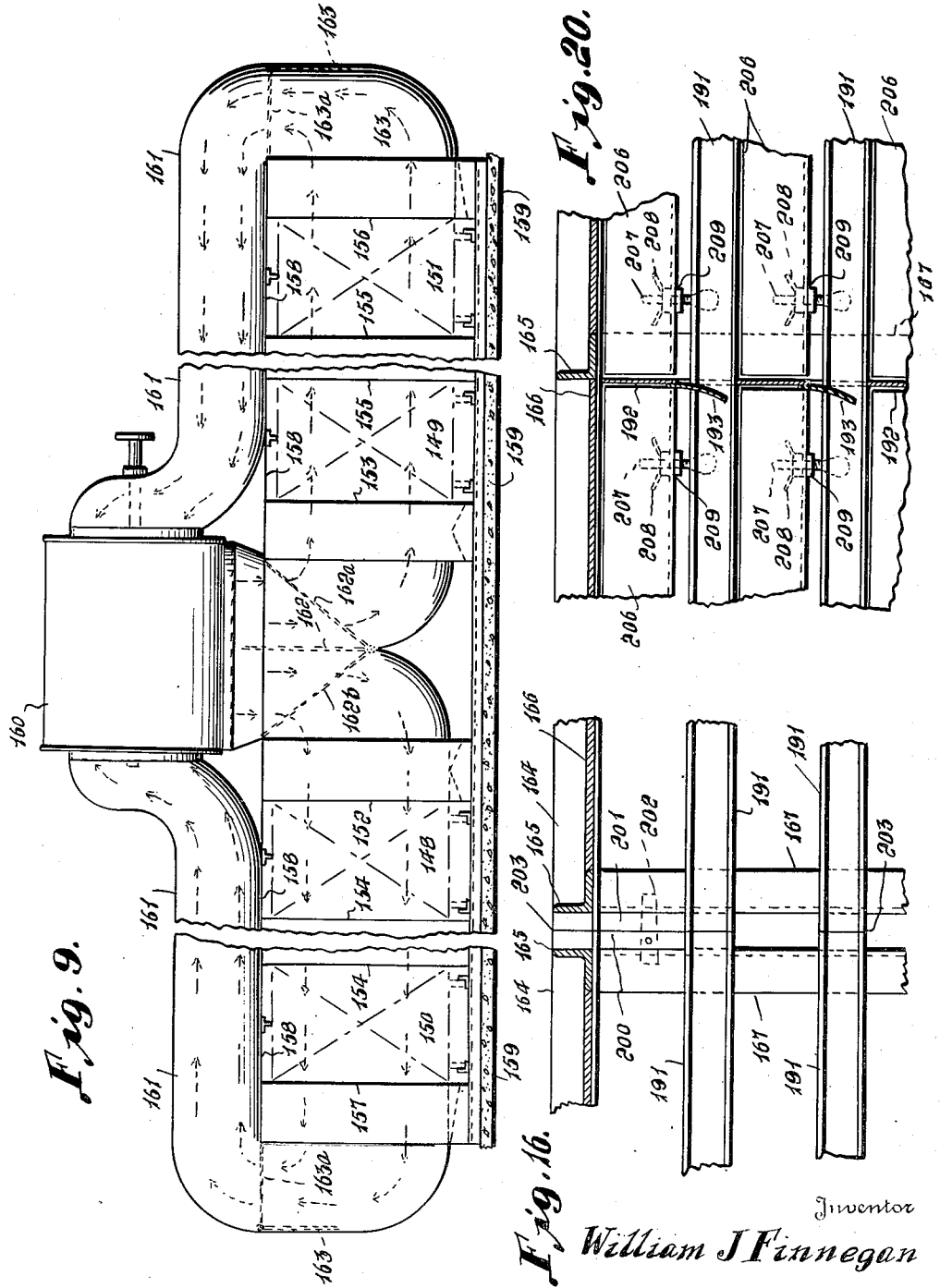

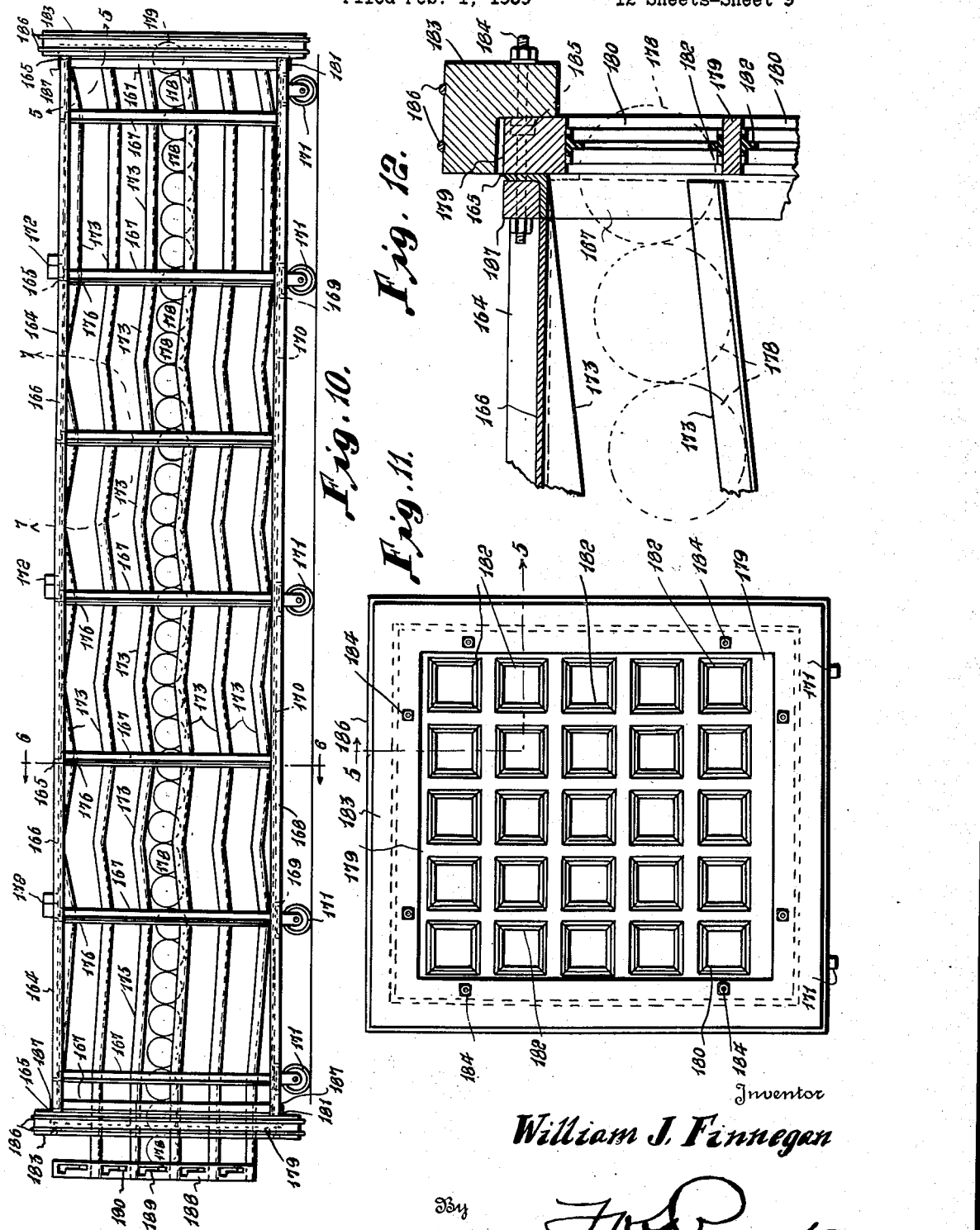

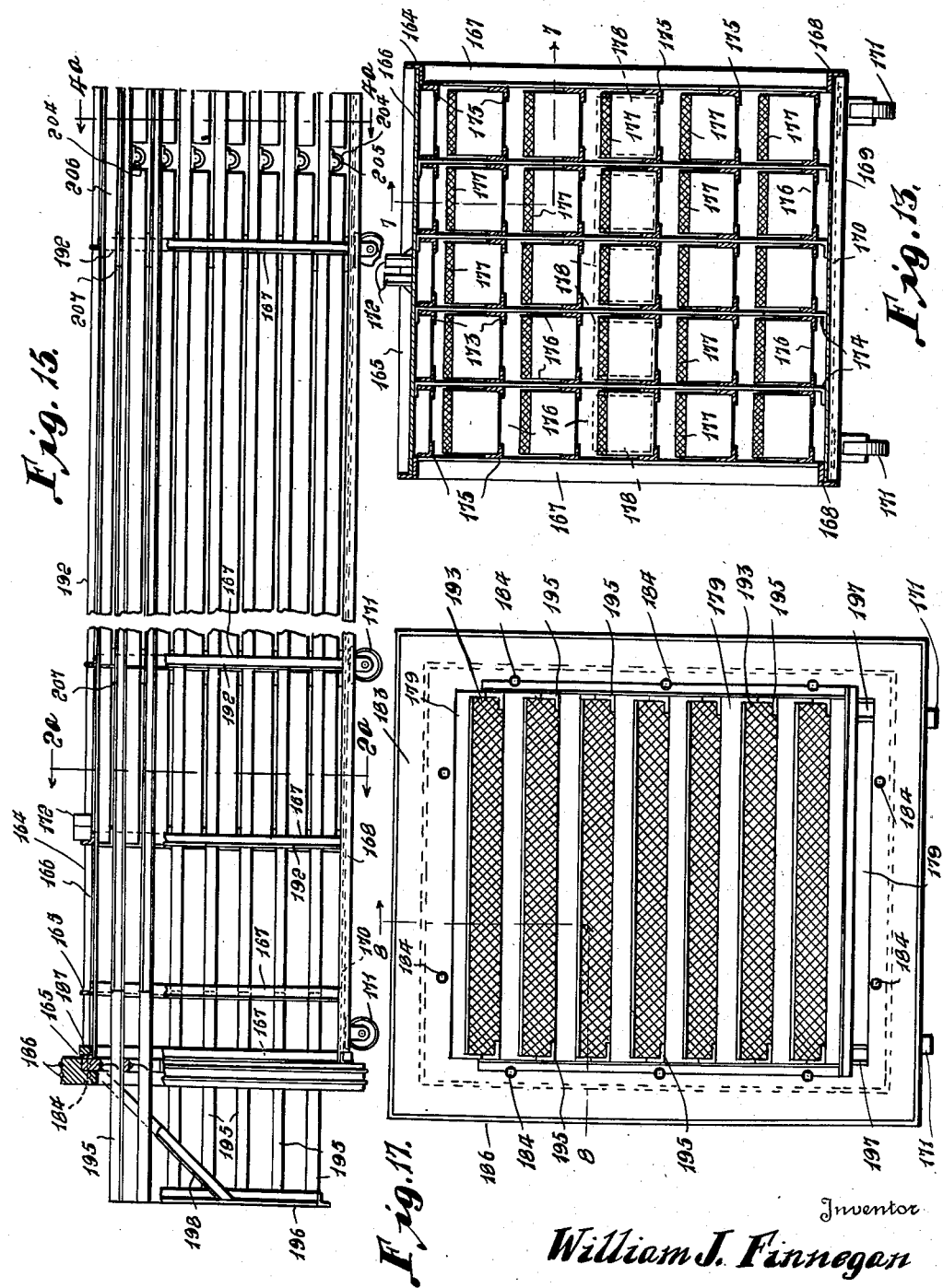

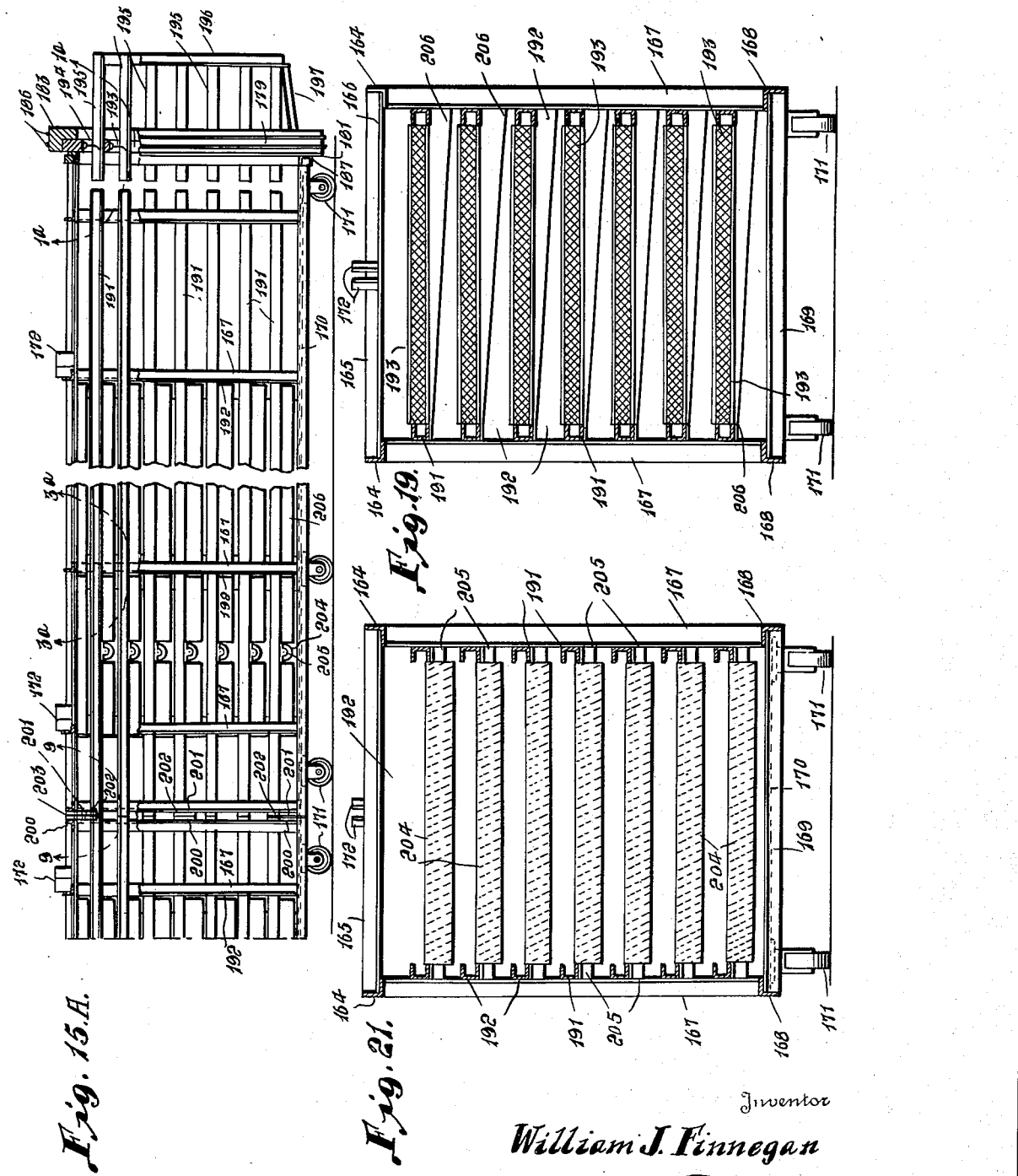

April 1, 1941.    W. J. FINNEGAN    2,237,257
METHOD AND APPARATUS FOR RAPID REFRIGERATING AND HANDLING OF FOODS
Filed Feb. 1, 1939    12 Sheets-Sheet 12
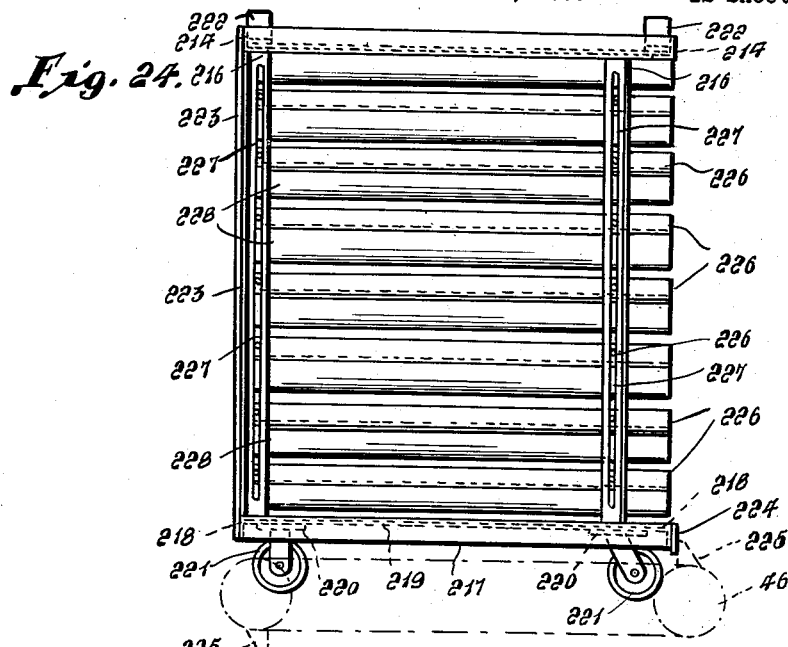
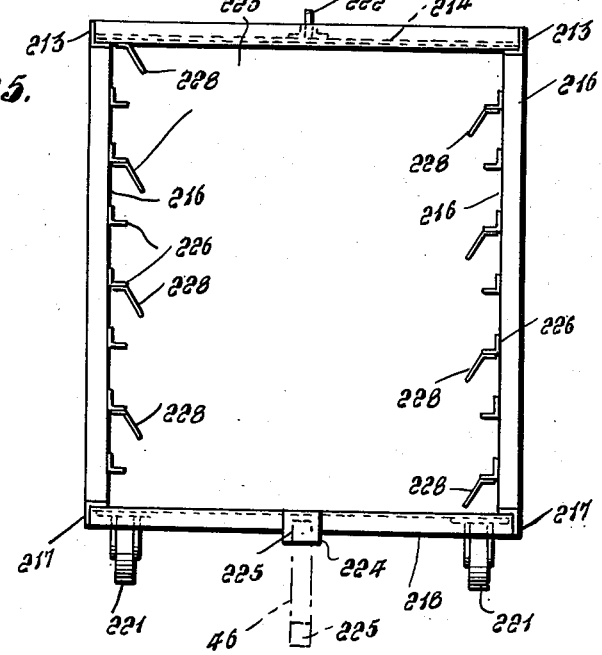
Inventor
William J. Finnegan
By T. K. Bryant
Attorney.

Patented Apr. 1, 1941

2,237,257

UNITED STATES PATENT OFFICE 2,237,257

METHOD AND APPARATUS FOR RAPID REFRIGERATING AND HANDLING OF FOODS

William J. Finnegan, Los Angeles, Calif.

Application February 1, 1939, Serial No. 254,110

24 Claims. (Cl. 62—170)

This invention relates to new and useful improvements in the method and apparatus for rapid refrigerating and handling of foods, being directed to the further developments of the method and apparatus, the forms of which are shown and described in my co-pending application entitled Method and apparatus for multistage freezing of comestibles, filed October 11, 1937, Serial No. 168,507.

The primary objects of the invention reside in improvements in the method and apparatus to provide efficient handling facilities for freezing various kinds of food in a manner best suited to care for commercial requirements, to provide means for controlling the physical condition of the heat transferring vehicles used for freezing, to provide for adequate and economical precooling of the foods before freezing and suitable tempering of the frozen foods before storage, to provide effective means for the accumulation of frost on the refrigerant's heat transferring surfaces without materially effecting the volume or pressure of the recirculated air used for freezing, to provide an effective means for distributing the recirculated air and to provide an arrangement whereby the recirculated air is confined within the food freezing compartments in a manner which prevents any warm or non-refrigerated outside air from entering the recirculated air system.

When foods are frozen in the presence of air at temperatures above minus 40° F., it is well known that the evaporation of moisture from such foods causes a considerable loss of weight in saleable product, damages the appearance of the finished frozen product and creates numerous other undesirable conditions. I have found that this evaporation can be greatly reduced by suitable control of the mean and average temperature difference between the refrigerant and recirculated air, also by suitable control of the mean and average temperature difference between the recirculated air and the food being treated, as hereinafter fully described. Therefore, another and very important object of the invention is to provide an arrangement embodying an effective means for substantially reducing the amount of moisture evaporation from foods so treated, and to improve the appearance of such foods.

With the above and other objects in view that will become apparent as the nature of the invention is better understood, the same consists in the novel method, form, combination and arrangement of parts hereinafter more fully described, shown in the accompanying drawings and claimed.

In the accompanying drawings:

Figures 1 and 1A are match line top plan views of a refrigerating apparatus with top casing removed to better show the arrangement of the refrigerating tube, heat transferring surfaces and connections.

Figure 2 is a vertical cross-section part side view on line 1—1 of the refrigerating apparatus shown in Figure 1, showing arrangement of refrigerant heat transferring surfaces and refrigerant connections.

Figure 4 is a top plan view of the refrigerating apparatus shown in Figure 1, showing the method of air circulation with two or more fans.

Figure 5 is a top plan view of another form of refrigerating apparatus with top casing removed to better show the arrangement of the refrigerating tubes, heat transferring surfaces and connections.

Figure 6 is a vertical cross-section part side view on line 3—3 of the refrigerating apparatus shown in Figure 5, showing refrigerant connections.

Figure 7 is a vertical cross-section end view on line 4—4 of the refrigerating apparatus shown in Figure 5, showing arrangement of freezing tubes, refrigerant heat transferring surfaces, fan, refrigerant connections and refrigerant accumulator.

Figure 8 is a diagrammatic view of the form of apparatus shown in Figure 5, with a single freezing tube and shows the method of air circulation, food freezing adaptors shown in Figures 24 and 25, with end baffles forming the multiple freezing compartments in the freezing tubes, precooling chamber and tempering chamber.

Figure 9 is a front end, cross-section elevation view of another form of refrigerating apparatus, showing the general arrangement of refrigerant heat transferring surfaces, food freezing tube adaptors and air recirculating system.

Figure 10 is a side elevation of a freezing tube adaptor for accommodating cans with foods for freezing, and is to be used in conjunction with the refrigerating apparatus shown in Figures 1, 4, 5, 8, and 9.

Figure 11 is an end elevation of the adaptor shown in Figure 10, showing the can feeding facilities;

Figure 12 is an enlarged vertical cross-section part side view on line 5—5 of the adaptor shown in Figure 10, showing details of can feeding end;

Figure 13 is a vertical cross-section end view on line 6—6 of the adaptor shown in Figure 10, showing the details of can handling facilities;

Figures 15 and 15A are part sectional views, on line 8—8, of another form of freezing tube adaptor for accommodating trays with foods for freezing, and is to be used in conjunction with the refrigerating apparatus shown in Figures 1, 4, 5, 8, and 9;

Figure 16 is an enlarged vertical cross-section part side view on line 9—9 of the adaptor shown in Figure 15, showing method of joining the two sections of the adaptor when used in conjunction with the refrigerating apparatus shown in Figures 1, 4, and 9;

Figure 17 is an end elevation of the adaptor shown in Figure 15, showing the tray feeding facilities;

Figure 18 is an enlarged vertical cross-section part side view on line 1a—1a of the adaptor shown in Figure 15, showing details of tray feeding end;

Figure 19 is a vertical cross-section end view on line 2a—2a of the adaptor shown in Figure 15, showing the arrangement of side air baffles and compartment air baffles;

Figure 20 is an enlarged vertical cross-section part side view on line 3a—3a of the adaptor shown in Figure 15, showing details of side air baffles and compartment air baffles;

Figure 21 is a vertical cross-section end view on line 4a—4a of the adaptor shown in Figure 15, showing the arrangement of food agitators;

Figure 22 is a top plan view of a food freezing tray;

Figure 23 is an enlarged vertical cross-section part end view on line 5a—5a of the food tray shown in Figure 22, showing construction details.

Figure 24 is a side elevation view of another form of freezing tube adaptor for accommodating trays with food for freezing, and is to be used in conjunction with the refrigerating apparatus shown in Figures 1, 4, 5, 8 and 9;

Figure 25 is an end elevation view of the freezing tube adaptor shown in Figure 24.

Figure 3:
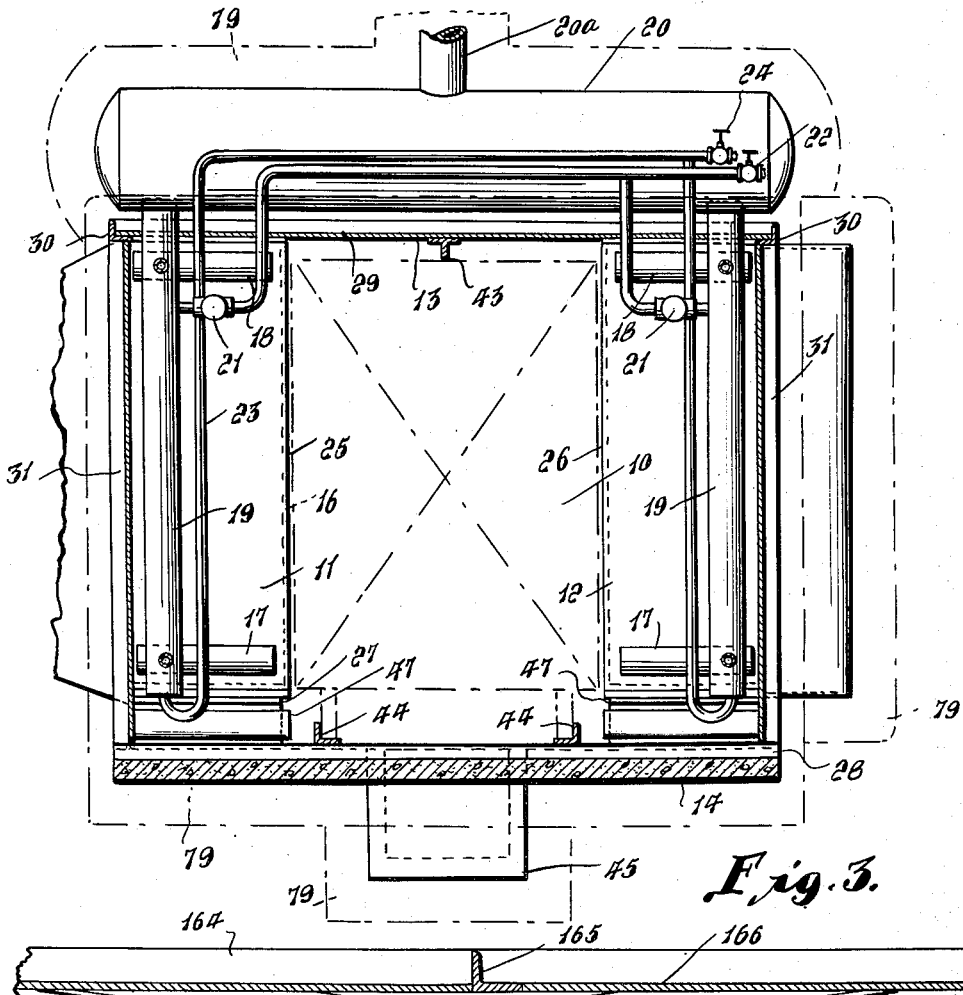
Figure 3 is a vertical cross-section part end view on line 2—2 of the refrigerating apparatus shown in Figure 1, showing arrangement of refrigerating tube, heat transferring surfaces and refrigerant connections.

The apparatus illustrated in Figures 1 to 3 comprises a rectangular shaped refrigerating tube 10 formed by refrigerant heat transferring surfaces 11 and 12, sheet metal housing 13 and flooring 14. The refrigerant heat transferring surfaces 11 and 12 may be made and formed of any suitable materials as by continuous bent and welded steel pipe coils 15 with extended sheet metal fin surfaces 16 and fitted with refrigerant liquid supply pipe connections 17, and refrigerant gas return connections 18. For operating the refrigerant coils under a flooded condition the refrigerant liquid and gas connections may be connected to the refrigerant liquid recirculating pipes 19 which have top outlets into the refrigerant accumulator 20, bottom defrosting connections 23 with stop valve 24, and refrigerant liquid float control feed valves 21 with connections and stop valve 22. All connections preferably of welded construction. The refrigerant heat transfer surfaces have extended metal fin surfaces 25 forming air partition baffles and extended metal fin surfaces 26 forming coil supports and partition baffles. Coils and fin surfaces are preferably galvanized by the hot process after fabrication to insure good bond between the fin surfaces and coils. Refrigerant accumulator 20 is fitted with a welded gas outlet pipe connection 20a which is connected to the refrigerant compressor in the usual way. Coil supports 26 rest on cross T-irons 27 which are supported by channels 28. The structural steel housing framework, preferably of all welded construction, consists of T irons 29 welded to border angle irons 30 which are welded to and supported by T irons 31. T irons 31 are welded to and supported by cross channel irons 28 which are imbedded and anchored in concrete floor 14. The housing 13 preferably made of galvanized sheet metal is riveted and soldered to the structural steel framing 29, 30 and 31, so as to provide a hermetically sealed casing which encloses the apparatus and forms the air distributing ducts 32 and 33, return air ducts 34 joining air inlets of air recirculating fan 35. Where metal housing joins concrete floor between channels 28 the metal extends into a groove in floor and the groove is filled with hot asphalt as required to seal the joint air tight. Internal air distributing ducts 36, fan discharge duct 37, air splitter 38 and air flow baffles 39 are also made of sheet metal and of riveted and soldered construction. Air splitter 38 is fitted with a hinged air regulating damper 40 which is operated by shaft extending through the top metal housing 13. The recirculating fan 35 has an extended shaft and flexible coupling 41 for connection to an electric motor or other suitable means for driving the fan. Where shaft passes through the return air duct 34 a gland seal 42 is provided as required to prevent air from entering the recirculating air system. T iron 43 is preferably welded to cross T's 29 and track guide angle irons 44 are similarly welded to cross channel irons 28 for the reception and guiding of the adaptors shown in Figures 10 to 25. The pit 45 preferably constructed of concrete and located in the concrete floor 14 at the receiving end of the apparatus is provided to accommodate any conventional pusher type conveyor 46 which is shown in phantom and in conjunction with Figures 24 and 25. Removable type drip pans 47 are located under the heat transferring surfaces 11 and 12, also under connections 17, 18, 19, 21, 22 and 23 as required to catch and accumulate water drip during the defrosting operation. Pans 47 may be made of galvanized sheet iron, shaped and formed as required to fit the spaces between the T irons 27. The food feeding and harvesting ends of the freezing tube 10 are fitted with freezer type insulated doors 48 with door frames 49 which have angle iron sills set in the concrete floor 14 and supported on top and sides by the welded structural steel frame 50. Each door frame 49 has an internal frame 51 extending around top and two sides for accommodating the adaptors shown in Figures 10 to 21. The air circulating baffles 25 and 26 form separate recirculated air cooling stages 52 to 67. Baffles 25 and 26 in conjunction with the adaptors with air baffles shown in Figures 10 to 25 form food precooling compartment 68 with air cooling surfaces 68a and 68b, food freezing compartments 69 to 76, food tempering compartment 77 with air cooling surfaces 77a and 77b and compartment for refrigerant connections 78. All compartments being indicated by cross lines in phantom. All external surfaces of the apparatus including the bottom side of concrete floor has suitable insulation 79 as required to reduce heat leakage to a minimum. The insulation may be made and applied in any adequate way as of sheet cork applied in hot asphalt with external finish of waterproof asphalt mastic. Attention is directed to a difference in the spacing of fin surfaces 16 in the recirculated air cooling stages 52, 54, 56 and 58 also in precooling compartment 68. The importance of this arrangement will be hereinafter fully described. It will also be noticed that the return bends of coils 15 have been omitted in Figure 3 to more clearly show the arrangement of refrigerant connections.

The apparatus illustrated in Figure 4 comprises a rectangular shaped refrigerating tube arranged and constructed in the same manner and of identical materials hereinbefore described and shown in the accompanying drawings Figures 1, 2 and 3, with provisions and arrangement shown for operating the apparatus with two or more fans and two or more refrigerant supply and return connections, the important advantages gained by this arrangement will be hereinafter fully described. Air recirculating fans 80 and 81 have independent and separate air recirculating systems, and may be driven by direct connection to motor 82 as shown or other convenient and suitable means. Fan shafts 83 may extend to and drive other fans with separate recirculating air systems when required. Refrigerant liquid supply connections 84, defrosting connections 85 and refrigerant liquid recirculating pipes 86 serve the recirculated air cooling stages 52 to 59 and the food precooling compartment 68. Refrigerant liquid supply connections 87, defrosting connections 88 and refrigerant liquid recirculating pipes 89 serve the recirculated air cooling stages 60 to 67 and the food tempering compartment 77. The return refrigerant gas connections from the refrigerant liquid recirculating pipes 86 and 89 have independent outlets as shown and may be connection into separate refrigerant accumulators. Air regulating dampers 82a and 83a replace the air damper 40 shown in Figure 1. The refrigerating tube of this apparatus is arranged to receive and is operated in conjunction with the adaptors shown in Figures 10 to 25.

The apparatus illustrated in Figures 5, 6 and 7 comprises two rectangular shaped refrigerating tubes 90 and 91, formed and constructed in the same general manner and essentially of the same materials as hereinbefore described for the apparatus shown in Figures 1, 2 and 3, with minor provisions which may be used as an alternate construction or arrangement in place of that which is herein described for the apparatus shown in Figures 1, 2 and 3. The three banks of refrigerating surfaces have recirculating air baffles forming air cooling stages 92 to 103. The air baffles in conjunction with the adaptors shown in Figures 10 to 25 form food precooling compartments 104, 106, food freezing compartments 105 to 113 and food tempering compartments 114 and 115. The refrigerant connections provide for double coil feed and consist of liquid supply stop valves and connections 116, float controlled liquid feet valves 117, liquid recirculating pipes 118, liquid headers 119, suction headers 120, defrosting valves and connections 121, return gas connections 122 joining refrigerant accumulator 123 which has internal liquid baffle 124, liquid drain valve and connections 125 and gas outlet 126. Concrete foundations 127 which are pitched for drain are utilized to support refrigerant heat transferring surfaces and catch water drip during the defrosting operation in place of the T irons 27 and drip pans 47 shown in Figure 2. Two angle irons 128 with guide space between are utilized for guiding the adaptors shown in Figures 10 to 25, in place of the T iron 43 shown in Figures 1 and 3. The insulated freezer doors including frames and internal adaptor frames located at the food feeding and harvesting ends of the refrigerating tubes 90 and 91 are of the same design and construction as hereinbefore described for doors 48, frames 49, supports 50 and internal frames 51 shown in Figure 1. In addition, conventional type metal clad automatic closing freezer doors 129 and 130 are shown in adaptor frame as required to accommodate adaptors shown in Figures 24 and 25 with trays shown in Figures 22 and 23 for one method of operation as hereinafter described. The recirculated air damper 131 replaces and cares for the same function as damper 40 shown in Figure 1. Insulation 132 is of similar material and applied in the same manner as hereinbefore described for insulation 79 shown in Figures 1, 2 and 3. It will be noted that this form of the invention provides for cooling the food tempering compartment 114 and 115 with the exposed surfaces of the refrigerant connections. However it is obvious that additional heat transferring surface may be provided if required.

The apparatus illustrated in Figure 8 comprises an arrangement similar to that shown in Figures 5, 6 and 7 but utilizes only one refrigerating tube. Air circulating baffles 26 form separate recirculated air cooling stages 133 to 140. Baffles 26 in conjunction with the adaptors with air baffles shown in Figures 10 to 25 form food precooling compartment 141 with air cooling surfaces 141a and 141b, food freezing compartments 142 to 145 and food tempering compartment 146 with refrigerant connection for cooling air in the tempering compartment. Recirculated air regulating damper 147 is similar to and functions the same as damper 131 shown in Figure 5.

The apparatus illustrated in Figure 9 embodies similar materials and construction as hereinbefore described for the apparatus shown in Figures 1 to 8, but provides an arrangement consisting of two or more rectangular shaped refrigerating compartments or tubes 148 to 151 formed by refrigerant heat transferring surfaces 152 to 157, sheet metal housing 158 and concrete floor 159. Air recirculating fan 160 is located on top of the apparatus and discharges the recirculated air downwardly with recirculated air return ducts 161 located above the refrigerated compartments and refrigerant heat transferring surfaces, otherwise this apparatus is arranged and constructed similar to the apparatus described and shown in Figures 1 to 8, having recirculated air regulating baffles 162 and 163 which show their closed position in phantom lines 162a, 162b and 163a. Refrigerating tubes 148 to 151 operate in conjunction with the adaptors shown in Figures 10 to 25, and may have food precooling and frozen food tempering compartments as shown in Figures 1 and 5.

Figure 14:
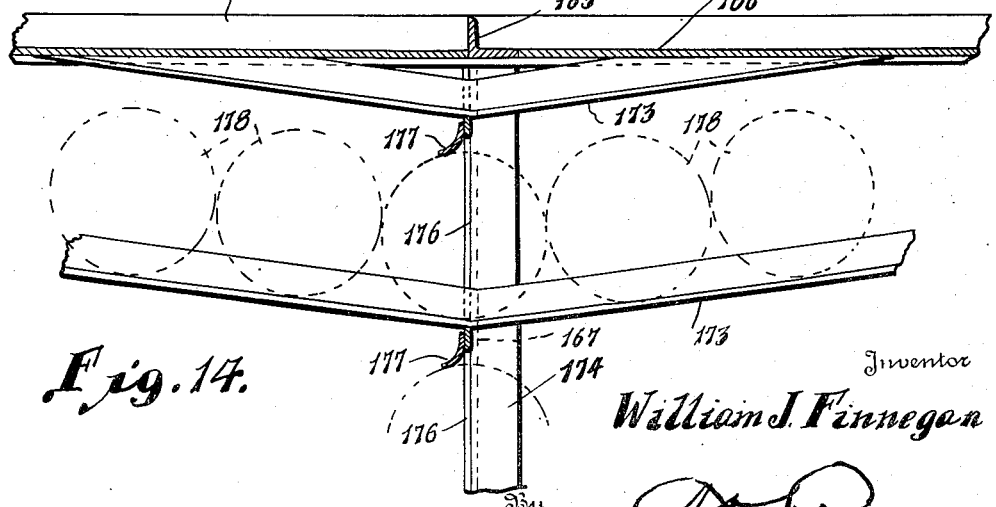
Figure 14 is an enlarged vertical cross-section part side view on line 7—7 of the adaptor shown in Figure 10, showing details of air baffles forming the freezing compartments.

The apparatus illustrated in Figures 10 to 14 is a refrigerating tube adaptor for handling and refrigerating the contents of round cans and the like when used in conjunction with the apparatus shown in Figures 1 to 9, and comprises a structural steel frame consisting of top corner angle irons 164 with cross angles 165 and top air directing plate 166, preferably of welded construction. Side angle irons 167 forming supports for top framing rest on bottom corner angle irons 168 which are supported by cross channels 169, all preferably of welded construction. Bottom angles 168 have air directing plate 170 which in conjunction with the top plate 166 forms the top and bottom enclosure for the recirculated air passages. Each of the cross channels 169 have two wheels 171 which are preferably equipped with roller bearings and of steel construction with the outside rim machine finished to form a guide and running fit in the freezing tube guide track angle irons 44 shown in Figures 1 to 7. Guide pieces 172 are welded to cross angles 165 to form a guide slot for the reception of guide tie 43 shown in Figures 1 and 3 or may be formed as shown on adaptor Figures 24 and 25, which are operative with angle iron guides 128 shown in Figures 5 and 7. Angle iron container guides 173 are supported by steel supporting strips 174. Angle iron container guides 175 are supported by side angles 167. Container guides 173 and 175 may be fastened to supports by any convenient means as by welding or bolting. Supporting strip 174 is similarly fixed to cross angles 165 at top and to air directing plates 170 or cross channels 169 on bottom. The face of side angles 167 and one edge of supporting strips 174 have a compartment recirculating air baffle 176 which coincides with the recirculating air baffles 25 and 26 shown in Figures 1 to 9, and thereby form the separate refrigerating compartments in the refrigerating tubes hereinbefore described and shown in Figures 1, 4, 5, and 8. Baffles 176 are preferably made of sheet metal and fixed by any convenient means as by machine screws or welding, and fitted with flexible curtain type baffles 177 which contact the top of containers 178 to form an air seal at this point. Baffles 177 may be made of any flexible material as of rubberized cloth or flexible metal cloth and fixed by machine screws. It will be noted that the container angle iron guides 173 and 175 are placed in a vertical and horizontal spaced relation so as to prevent the derangement of any container. The angularity of the angle iron guides 173 and 175, as shown in Figures 10 and 14, may be increased or decreased for various diameters of containers as required to cause the vertical center line of the container to coincide with the compartment recirculating air baffles 176. The container feeding and harvesting ends of the adaptor are fitted with covers 179 which have apertures 180 for passage of the containers to and from the adaptor. Covers 179 are preferably made of wood or other material having a good insulating value and are suitably secured to the adaptor by any convenient means as by screws which are fastened into cross angles 165, side angles 167 and bottom angle 181. Apertures 180 have flexible air seals 182 which permit passage of the containers, but contacts the surface of one container so as to form an air seal on container feeding and harvesting ends of the adaptor. Flexible seals 182 may be made of any suitable material as of composition rubber or canvas reinforced with spring metal and be fixed to covers by any convenient means, such as, wood screws with washers or with metal bearing plate under screw heads. Each cover 179 has an air sealing frame 183 preferably made of wood or other material having a good insulating value, and are suitably secured to covers by machine screw studs 184 which may have collars 185 for securing covers to adaptor frame as shown. Frames 183 have air sealing gaskets 186 which fit in contact with the internal adaptor frames 51 shown in Figures 1 and 5. A separate wood filler strip (not shown) is used at the bottom of frames 183 for contacting the concrete floor and sealing the space between the frames 183 and the concrete floor 14 shown in Figures 1 to 3 and 5 to 7. Top angle irons 165, side angle irons 167 and bottom angle irons 181 which form the ends of adaptor frame have lugs 187 preferably welded in place to strengthen the angle irons and accommodate the screw studs 184. Angle iron container guides 173 and 175 extend through cover 180 on the harvesting end of the adaptor and have metal side strips 188 at ends, preferably fixed to guides by welding. Side strips 188 have slots 189 notched out at top to accommodate the container stop rods 190 which extends across each horizontal row of containers 178. The container stop rods 190 locate and centralize one container in the center of each compartment recirculating air baffle 176 and by sliding the stop rods up in slots 189 to the resting notch located in the top of each slot, the end container in each horizontal row may be harvested from the refrigerating tube adaptor.

The apparatus illustrated in Figures 15 to 21 is a refrigerating tube adaptor for handling and refrigerating foods placed on trays when used in conjunction with the apparatus shown in Figures 1 to 9, and comprises a welded structural steel frame with top plate 166, bottom plate 170, wheels 171, guide pieces 172, end covers 179, air sealing frames 183 with screw studs 184 having collars 185, gaskets 186 and lugs 187, all of which are preferably of the same kind of material and of the same arrangement and construction as hereinbefore described in connection with the freezing tube adaptor shown in Figures 10 to 14. Food trays, similar to the tray shown in Figures 22 and 23, are used in the adaptor shown in Figures 15 to 21. Therefore, side angles 167 are fitted with tray guiding channel irons 191, preferably fixed to side angles by welding. The face of side angles 167 have compartment recirculating air baffles 192 which coincide with the recirculating air baffles 25 and 26 shown in Figures 1 to 9, and thereby form the separate refrigerating compartment within the refrigerating tubes hereinbefore described and shown in Figures 1, 4, 5 and 8. Baffles 192 are preferably made of sheet metal and fixed by any suitable means as by machine screws or welding, and fitted with flexible curtain type air baffles 193 to form an air seal with trays or produce. Flexible baffles 193 are fixed to baffles 192 by screws and made of similar material as hereinbefore specified for flexible baffles 177 shown in Figure 14. Covers 179 have apertures 194 for the passage of trays shown in Figures 22 and 23, which have flexible curtain type air baffles 193 fixed to the top of each aperture with screws and made of material similar to that specified for flexible baffles 177 shown in Figure 14. Tray guides 195 on feeding and harvesting ends of the adaptor are made of angle irons with angle iron strengthening frame 196 having bottom angle iron braces 197 on feeding end and side braces 198 on harvesting end. Guides 195 are preferably fixed to side angles 167 by welding, with frame 196 and braces 197 and 198 similarly constructed. A space 199 is provided between guide channels 191 and guide angles 195 on the feeding end of the apparatus which will be later explained. When the refrigerating tube adaptor is used in conjunction with refrigerating tubes having ten or more refrigerating compartments as shown in the apparatus Figures 1 and 4, it may be desirable to construct the adaptor in two or more sections. Therefore Figures 15 and 16 show one method of construction which will adequately provide for this requirement and is applicable to the construction of the adaptor shown in Figures 10 to 14, and consists in initially constructing the adaptor in one section with two small metal bearing blocks 200 and 201 which are fixed to side angle irons 167 in true face alignment by any suitable means as by bolting or welding and be arranged in contact with each other at the two top corners, two bottom corners and midway between the top and bottom corners on each side of the adaptor frame as shown. Each block to be drilled and reamed in position to fit a taper locating pin 202, which is fixed by a bolt or pin in block 200. The separate sections of the adaptor may then be formed by cutting the angle irons 164, 168 and container guides 173, 175 or tray guides 191 at point 203, by any convenient means as by sawing. When adaptor sections are joined the bearing blocks 200 and 201 form the only lateral bearing points and the taper pins assure true alignment of the adaptor sections. In commercial freezing of peas, lima beans, berries and the like on trays it is known that such foods freeze tight to the trays. I have found that agitating or slightly moving such foods at certain stages of the freezing operation will prevent such foods from freezing to the trays and will discharge these foods from the apparatus in a separate and individual frozen condition. Therefore, food agitators 204 are provided and shown in Figures 15 and 21, which consists of a wire brush roller preferably made of stainless steel wire which is wound spiral to form a round roller with circumferential surface formed by points of wires that are ground to an even and round surface. Each food agitator 204 has bearings 205 at each end, which are preferably fixed to the under side of tray channel guides 191 by screws that pass through countersunk holes in channel guides. The food agitating action results from the movement of the food trays over the agitators which imparts a revolving motion to the agitators and forces the stainless steel wires up through the bottom of the open mesh wire screen food trays shown in Figures 22 and 23, thereby moving the food gently but a sufficient amount to prevent the food from freezing to the trays. It has been found that the food only requires such agitation or movement twice during the freezing process to effect the desired result, and when this freezing method is practiced in the apparatus shown in Figures 1 to 4, it should be applied in compartments 71 and 74, when practiced in the apparatus shown in Figures 5 to 7, it should be applied in compartments 107, 108, 111 and 112 and when practiced in the apparatus shown in Figure 8, it should be applied in compartments 143 and 144. The adaptor shown in Figures 15 to 21 has adjustable compartment recirculated air baffles 206 which are preferably made of sheet metal and fixed on one side to the bottom edge of tray guiding channel irons 191 by countersunk screws excepting the top baffle which is fixed to the top plate 166 in the same manner. The opposite side of baffle is supported and adjusted by machine screw studs 207 with wing nuts 208 and lock nuts 209 shown in Figure 20. Adjustable baffles 206 extend the full length of each recirculating air compartment except where they are cut away for the installation and operation of agitators 204. Baffles 206 are used for the purpose of forcing an economical quantity of the recirculated air up and down through the food on the produce tray by increasing or decreasing the openings 210 for passage of the recirculated air. The opening 210 being formed by the top of tray channel guides 191 and bottom edge of adjustable baffles 206. The quantity of recirculated air which can be economically forced through such foods as berries, peas, beans, corn on cob, etc., varies considerably. However, it is exceedingly important that the greatest quantity, consistent with economy, be forced through such foods in order to produce the desirable results hereinafter described.

The food trays illustrated in Figures 22 and 23 are used in conjunction with the adaptors shown in Figures 15 to 21, 24 and 25, and may be constructed of any suitable material as by heavy open mesh wire screen 211, formed as shown and reinforced around edges with sheet metal 212, which is formed and pressed into position so as to provide a secure key bond between the screen 211 and the reinforcing sheet metal 212. Where tray contacts channel or angle iron tray guides in adaptors shown in Figures 15 to 21, 24 and 25, the sheet metal 212 extends under tray on two sides to make such contacts and to provide a smooth surface for the sliding of tray in tray guides.

The apparatus illustrated in Figures 24 and 25 is a refrigerating tube adaptor for handling and refrigerating foods which are placed on trays and is used in conjunction with the apparatus hereinbefore described and shown in Figures 1 to 9, and comprises a welded structural steel frame consisting of top side angle irons 213, top end angle irons 214, top air directing plate 215, side angle irons 216, bottom side angle irons 217, bottom end angle irons 218 and bottom air directing plate 219. Cross channels irons 220 are preferably welded to each bottom side angle iron and have four roller bearing steel wheels 221 which are preferably fixed to channels by bolts and lock nuts. Two of the wheels on one end of the adaptor are swivel type as required for ease of handling and rolling of the adaptor, otherwise the wheels 221 are of the same design, arrangement, construction and used for the same purpose as the wheels 171 as hereinbefore described in connection with the adaptors shown in Figures 10 to 21. The T iron guide slippers 222 are preferably welded to the top end angle irons 214 and run in the guide space formed between the two angle iron guides 128 shown in Figures 5 and 7, and may be operated in conjunction with the apparatus shown in Figures 1 to 4, 8 and 9 by using the guide pieces 172 shown on adaptors in Figures 10 to 21. The compartment recirculating air baffle 223 which completely closes and seals one end of the adaptor coincides in alignment with the recirculating air baffles 25 and 26 shown in Figures 1 to 9. Each of these adaptors thereby forms the separate refrigerating compartments in the refrigerating tubes hereinbefore described and shown in Figures 1, 4, 5 and 8. A bearing and pusher lug 224, preferably made of steel and welded to the bottom end angle iron 218, provides for contact with a pusher lug 225 preferably built integral with the sprocket chain on any conventional pusher type conveyor 46. The conveyor 46 is located in the conveyor pit 45 shown in Figures 1, 3, 5 and 7, its operation consists in moving or advancing the adaptors the length of one compartment, as each adaptor moves from the food precooling compartment to the first freezing compartment, it advances the adaptors ahead of it to the next compartment. When the adaptors fill the refrigerating tube, each adaptor conveyed from the precooling compartment to the first freezing stage or compartment advances the adaptor in the food tempering compartment out from the refrigerating tube through the "auto-close" type freezer doors 129 and 130 shown in Figure 5. The adaptors being initially shoved into the precooling compartment by hand. The column of adaptors within the refrigerating tube may also be advanced by hand shoving of the adaptor from the precooling compartment to the first freezing compartment, thereby eliminating the use of the pusher conveyor 46 and pit 45, if this method of handling is preferable. Angle iron tray holding guides 226 are preferably fixed to side angle irons 217 by screws which pass through slots 227 in side angle irons as required for adjusting the spaced relation of food trays shown in Figures 22 and 23. Adjustable recirculated air baffles 228 are preferably made of sheet metal and fixed to the bottom side of tray guides by screws. The top baffle being similarly fixed to top air directing plate 215. The adjustment of baffles 228 may be accomplished by a lock hinge or by simply bending the sheet metal to the desired position as required for producing the air circulating condition hereinbefore described in connection with the baffles 206 which are shown in Figures 15, 19, 20 and 21. The use of either type air baffle in either adaptor is contemplated and the adaptability for such use is believed to be obvious.

In practicing the refrigerating method and in the operation of the apparatus shown in Figures 1, 2, and 3, in conjunction with the refrigerating tube adaptor shown in Figures 15 to 21, the adaptor preferably in two sections is placed in the refrigerating tube with the sections joining in the center of the apparatus. The adaptor being guided at top by guide slot between guide lugs 172 into which the guide T iron 48 slides, and guided at the bottom by sides of wheels 171 which travel on and are guided by angle irons 44, so as to laterally place the recirculated air partition baffles 192 in close relation to the recirculating air baffles 25 and 26. Wedge type filler strips as hereinbefore described are then placed under each end frame 183. Refrigerating effect is then applied to the refrigerant heat transferring surfaces 11 and 12 through the liquid refrigerant connection 22, refrigerant float valves 22, refrigerant recirculating pipes 19 and refrigerant liquid coil headers 17. The refrigerant gas being returned to the refrigerant compressor through the refrigerant gas coil headers 18, top sections of refrigerant recirculating pipes 19, refrigerant accumulator 20 and return suction connection 20a. It will be noted that the gas coil headers 18 join the refrigerant recirculating pipes 19 above the refrigerant liquid levels which are maintained and controlled by the refrigerant float valves 22 at the point where they join the refrigerant recirculating pipes. This arrangement permits the liquid refrigerant to be separated from the refrigerant return gas in the top sections of the refrigerant recirculating pipes 19 and returned by gravitational effect for recirculation through the evaporating coils 15. Refrigerant accumulator 20 likewise separates and returns any free liquid refrigerant in the return refrigerant suction gas, thereby assuring the return of a relatively dry refrigerant gas to the compressor.

Trays shown in Figures 22 and 23 are filled with foods and fed into the refrigerating tube by simply placing said trays with foods on the feeding angle iron tray guides 195 and shoving each tray forward into the tray channel iron guides 191 with the following tray. It is preferable to have the length of each tray equal to the length of each refrgerating compartment 68 to 78 as formed by the recirculating air baffles 192; so that each tray will advance one refrigerating stage or one compartment as each tray with food is fed into the refrigerating tube. When the first trays have all advanced into the the precooling compartment 68 and the following trays are in place on the feeding angle iron tray guides 195, the air recirculating fan 35 is started and trays with food are continually fed into the refrigerating tube at required intervals. When the trays with frozen or refrigerated foods appear on the angle iron tray guides 195, located on the discharge end of the adaptor, they are removed, emptied and refilled with foods for a repetition of the cycle. The tray guides 195 located on the discharge end of the adaptor are of the required length necessary to form a stop for each column of trays so that the trays being fed into the adaptor need only to be shoved against said stop in order to place all trays in each column in their proper position and in the longitudinal center of each refrigerating compartment.

In practicing the refrigerating method with the refrigerating tube adaptor shown in Figures 10 to 14, in which round containers such as tin cans are used to hold the foods being processed, the adaptor would preferably be in two sections when used in conjunction with the refrigeration apparatus shown in Figures 1, 2 and 3. The arrangement of the adaptor in the refrigerating tube, application of refrigerating effect and air circulation is the same as hereinbefore described in connection with the use of the refrigerating tube adaptor shown in Figures 15 to 21. The round containers with food are shoved into apertures 180 and are guided by the angle iron guides 173 and 175 on which the columns of containers roll. The stop rods 190 located on the discharge end of the adaptor serve to center certain containers in relation to the recirculating air baffle 176 as required to air seal the refrigerating compartments 68 to 78 which are formed by the baffles 176. Harvesting of the containers with frozen food is accomplished by lifting the rods 190 in slot 189 which releases the end container.

It will be noted that the containers peculiar to the application above described are continually revolved as freezing progresses by the method used for conveying the containers through the refrigerating tube. The numerous advantages and desirable conditions gained by agitating the food within the container through revolving the container as the freezing of the food progresses is thoroughly described and shown in my pending application entitled "Method and apparatus for quick freezing, preserving and handling of comestibles," filed May 29th, 1937, Serial No. 145,620.

In practicing the refrigerating method with the refrigerating tube adaptor shown in Figures 24 and 25, in which the food trays shown in Figures 22 and 23 are used to hold the foods being processed, the adaptor with food trays is used in multiple and arranged so that each adaptor with recirculating air baffle 223 forms one of the refrigerating compartments 68 to 78 shown in Figures 1, 2 and 3. The refrigerating effect and air recirculation is applied in the same manner as before described in connection with the use of the refrigerating tube adaptor shown in Figures 15 to 21. The food to be treated is placed on the trays and the trays with food are then put into the adaptor on the angle iron tray guides 226. The adaptors are loaded in this manner at any convenient location on the outside but near the feeding end of the refrigerating tube. Eleven empty adaptors with trays occupy, and with recirculating air baffles 223 form the refrigerating compartments 68 to 78. The door 48 on the discharge end of the refrigerating tube is opened when the recirculated air is lowered to the required temperature, then the pusher conveyor 46 is started, which advances the column of adaptors to the adjacent refrigerant compartment. This movement causes the adaptor in the food tempering compartment 77 to be discharged from the refrigerating tube and the adaptor in the food precooling compartment 68 to be advanced into the first freezing compartment 69. The door 48 on the discharge end of the refrigerating tube is then closed and the door 48 on the feeding end of the tube is opened so that the loaded adaptor with trays of food can be pushed into the food precooling compartment 68, after which the door 48 is closed. The discharged adaptor is then loaded with food in the manner above described and the discharging, loading and feeding cycle repeated at suitable intervals as required to accomplish the desired treatment of the foods.

In the preparation and handling of such foods as cut corn, corn on the cob and the like, prior to freezing, it has been found that the flexibility afforded in the use of the adaptor shown in Figures 24 and 25 permits this adaptor with trays to be utilized for the purpose of blanching and fore-cooling of such foods before freezing, and to accomplish the three operations of blanching, forecooling and freezing without removing or rearranging such foods or trays.

The direction of the recirculated air flow in the apparatus shown in Figures 1, 2 and 3 is indicated by arrows shown in Figure 1. The novel method employed for distributing the recirculated air consists of splitting the discharged air from the fan into two separate streams, one of which serves the food freezing compartments 69 to 72 and the other serves the food freezing compartments 73 to 76. It will be noted that each air stream is cooled in two stages before being delivered to any one freezing compartment. For example: The air delivered to the first freezing compartment 69 is cooled in the air cooling stages 52 and 53, air to compartment 70 is cooled in stages 54 and 55, air to compartment 71 is cooled in stages 56 and 57, air to compartment 72 is cooled in stages 58 and 59 and is likewise cooled throughout the rest of the freezing compartments. The air flow passages formed by the refrigerant heat transferring surfaces in each air cooling stage are restricted for the purpose of increasing the rate of heat transfer, also to increase the air velocity to a point consistent with an economical air flow resistance, which further increases the rate of heat transfer from the air to the refrigerant heat transferring surfaces. The adaptors with foods are utilized to restrict the air flow passages in each freezing compartment to accomplish the acceleration of heat transfer from the foods to the recirculated air, and to further increase this rate of heat transfer from the foods to the recirculated air, adjustable air baffles 206 and 228 are provided in adaptors shown in Figures 15 to 21, 24 and 25, for the purpose of forcing the greatest economical quantity of air through the foods which are arranged on the trays shown in Figures 22 and 23. Due to the peculiar arrangement of the air ducts and baffles, it will be further noted that the direction of the longitudinal flow of the air through the freezing compartments 69 to 72 and 73 to 76 is reversed in respect to the directional flow of the air in each adjacent freezing compartment, which automatically reverses the vertical directional flow of the air through the food trays, due to the peculiar arrangement of the recirculated air baffles 206 and 228.

This method of air distribution greatly accelerates heat transmission from the foods to the secondary heat transferring vehicle, which may be air or other suitable gas, and from the secondary heat transferring vehicle to the primary heat transferring vehicle, which may be ammonia or other suitable chemical. Moreover, the multi-staging of these heat transfers makes it possible to greatly reduce the temperature rise of the air during its passage over the foods in each freezing compartment. This condition permits the recirculated air to be held at the highest possible relative humidity, which in turn reduces the amount of moisture evaporation from the foods to a minimum. To further this very desirable condition the air damper 40 is provided for the purpose of regulating the volume of air recirculated through the first four freezing compartments 69 to 72 so that the mean air temperature rise in these compartments will be approximately the same as that existing in the last four freezing compartments 73 to 76. It is well known that relatively warm foods will give off considerably more heat than partially frozen foods, which is principally due to the large temperature difference existing between such warm foods and the recirculated air as compared to the small temperature difference existing between partially frozen foods and the recirculated air. This condition would normally cause a larger temperature rise of the air during its passage over the foods in the first four freezing compartments 69 to 72, as compared to that existing in the last four freezing compartments 73 to 76. However, this air temperature rise may be equalized by regulating the damper 40 as required for increasing the volume of air being recirculated through the first four freezing compartments with respect to the volume being recirculated through the last four freezing compartments. It will be noted that the extended fin surfaces 16 are on wider spacing in the air cooling stages 52, 54, 56 and 58, which reduces the air flow resistance through the first four freezing compartments thereby permitting a larger volume of air to be circulated through these compartments while maintaining a balanced condition in the two recirculated air streams in respect to air flow resistance.

The food precooling compartment 68 and food tempering compartment 77 have no forced air circulation, thus serving the additional purpose of refrigerated air locks at each end of the refrigerating tube. It is believed obvious that this condition in conjunction with the balanced condition of the two recirculated air streams in respect to air flow resistance precludes the possibility of any warm outside air entering or mixing with the rerecirculated air streams used for freezing.

Foods are initially cooled in the food precooling compartment 68 by the extended refrigerant heat transferring surfaces 11 and 12, which have extended fin surfaces on wide spacing for the purpose of depositing the excessive free moisture accompanying such foods on the heat transferring surfaces in the form of frost. After the foods have passed through the freezing compartments 69 to 76 they enter the food tempering compartment 77, where the frozen foods remain a sufficient length of time to permit them to gain the required even temperature throughout before they are finally discharged from the apparatus. The food tempering compartment 77 is likewise refrigerated by the extended refrigerant heat transferring surfaces 11 and 12.

From the foregoing it will be observed that the removal of the total heat required for freezing various kinds of foods to a desired temperature is accomplished in ten stages consisting of one precooling stage, eight freezing stages and one tempering stage, and that the recirculated air used as a secondary heat transferring vehicle for freezing purposes is recooled by the primary refrigerant heat transferring surfaces in sixteen stages. In other words, each freezing stage or compartment removes only a fractional part of the total heat and promptly transfers this fractional amount of heat to two air cooling stages before similar heat transfer action takes place in the following stages, and that this heat transfer action occurs simultaneously in all eight freezing stages or compartments. The precooling and tempering stages or compartments also remove their fractional part of the total heat and transfers same by convection to the primary refrigerant heat transferring surfaces. This novel heat transfer action in conjunction with the novel method of distribution and control of the physical condition of the recirculated air permits a very close approach to that which is known to be an ideal condition for the preservation of foods by freezing.

Defrosting of the refrigerant heat transferring surfaces is rapidly and effectively accomplished by opening the defrosting valve 24 which is connected to the liquid refrigerant drain connections 23 and discharges to the refrigerant storage receiver. Then by reversing the refrigerant's heat transferring cycle and utilizing the refrigerant condensing circulating water as a source of heat the refrigerant heat transfer surfaces will be rapidly defrosted. This operation consists of shutting off the refrigerant liquid supply to the float control valves 21 by closing stop valve 22, open a liquid expansion valve and feed the refrigerant liquid to the refrigerant condenser while the condensing water is being circulated through the condenser in the usual manner. Then open the hot gas discharge by-pass valve from the refrigerant compressor which discharges into the refrigerant suction connection 20a and close the suction valve to the compressor which serves connection 20a, then open the by-pass refrigerant suction valve connecting the refrigerant condenser to the compressor suction. The condenser suction pressure should be maintained sufficiently high so as to prevent any possibility of freezing the circulating water. This method of operation simply reverses the refrigerant's heat transferring cycle by utilizing the refrigerant condenser as a refrigerant evaporator and the refrigerant evaporator as a refrigerant condenser, thereby rapidly defrosting the evaporator or refrigerant heat transferring surfaces 11 and 12. The water drip caused by defrosting is caught in drip pans 47 located under all refrigerant heat transferring surfaces which are easily removed and replaced as required for removing water.

While provisions are included for defrosting the refrigerant heat transferring surfaces as before described, it is to be understood that one of the important phases embodied in this invention is the combination of numerous conditions in conjunction with the novel arrangement which reduces frost accumulation on the refrigerant heat transferring surfaces to a minimum. In this connection, the refrigerant heat transferring surfaces are proportioned to maintain a very small mean temperature difference between the refrigerant temperature and the recirculated air temperature, the recirculated air temperature rise during its passage through each freezing compartment is very small and these conditions reduce the evaporation of moisture from the foods to a minimum. The hermetically sealed casing 13 in conjunction with the arrangement of the recirculating air system precludes the possiblity of any warm outside air entering or mixing with the recirculated air. If any such air found its way into the precooling or tempering compartments it would become dehumidified by the relative low temperatures existing in these compartments and by contact with the refrigerant heat transferring surfaces. The restriction of air flow passages not only results in a higher rate of heat transfer for any fixed air velocity but also creates a condition which makes it possible to maintain the recirculated air in a supersaturated condition, furthermore the restricted air flow passages with high air velocity provided in the refrigerant heat transferring surfaces serve to wear down and evaporate frost accumulations when the temperature difference between the recirculated air and the refrigerant is very small. For this reason the air cooling stages 52, 54, 56 and 58 have relatively wide spacing of extended fins 16, which induces frost to accumulate at these points where such accumulation will not materially effect the efficiency of the recirculating air system. Note that the stages 52, 54, 56 and 58 are in each instance the first refrigerant heat transferring surfaces contacted by the air leaving the food freezing compartments 69 to 72, therefore they are initially contacted with the warmest air present in the first four freezing stages, which represents the warmest air in the recirculated air system due to the relative large temperature difference between the foods and recirculated air. It is believed that the foregoing explanations make it evident that a minimum of frost accumulation occurs on the refrigerant heat transferring surfaces used for cooling the recirculated air, and that such frost accumulation is deposited in a manner so as to improve the efficiency of the refrigerating and air recirculating cycles.

The operation of the apparatus shown in Figure 4 in conjunction with any of the refrigerating tube adaptors shown in Figures 10 to 25 is the same as hereinbefore described for the operation of the apparatus shown in Figures 1, 2 and 3. This form of the invention embodies the same apparatus as shown in Figures 1, 2 and 3 but includes the use of two air recirculating fans 80 and 81 which provides two separate air recirculating systems, with separate refrigerant connections to serve the air cooling stages in each of the separate air recirculating systems. The arrangement provides for furthering the desirable effects resulting from the novel heat transfer action, method of air distribution and control of the physical condition of the recirculated air hereinbefore described in connection with the operation of the apparatus shown in Figures 1, 2 and 3, by accomplishing the desired refrigeration of foods in four steps consisting of precooling, prefreezing, freezing and tempering. Wherein the food is precooled in the precooling compartment 68, prefrozen in the food prefreezing compartments 69 to 72, frozen in the food freezing compartments 73 to 76 and tempered in the food tempering compartments 77. The food precooling and tempering compartments 68 and 77 function in the same manner as hereinbefore described. The food prefreezing compartments 69 to 72 have an independent air recirculating system served by fan 81 and cooled by air cooling stages 52 to 59. The food freezing compartments 73 to 76 have an independent air recirculating system served by fan 80 and cooled by air cooling stages 60 to 67. Fans 80 and 81 are shown directly connected to the electric motor 82 with extended shafts 83 for driving other fans when the capacity is increased or the apparatus extended to include additional air recirculating systems. However the fans may be independently driven if desired or as may be required under certain conditions for recirculating a greater quantity of air in the prefreezing compartments as compared to the quantity required to be recirculated in the freezing compartments. Air regulating dampers 82a and 83a perform the same functions as the air regulating damper 40 before fully described and shown in Figure 1, and thereby permits similar regulation of the two air recirculating systems. Compartment 78 in both forms of the invention shown in Figures 1 to 3 and 4, provides the required space for refrigerant connections and eliminates the need of insulating these connections so that the exposed surfaces of the connections may be utilized for transferring some refrigerating effect to the foods while they are in this compartment. As shown and previously described the refrigerant heat transferring surfaces which supply the refrigerant effect for the food prefreezing compartments and food precooling compartment have separate connections, likewise the refrigerant heat transferring surfaces which supply the refrigerating effect for the food freezing compartments and food tempering compartment also have separate connections. The return refrigerant gas connections from the two refrigerating systems are connected into separate refrigerant accumulators which have individual refrigerant suction connections to the refrigerant compressor.

In the preservation of foods by freezing over 90% of the heat required to be removed by refrigerating effect is accomplished above 20° F., with the remaining 10% being removed in lowering the temperature of the frozen foods to 0° F. or the temperature at which the frozen foods are normally stored. Moreover, a saving in electrical power of approximately one kw. hr. will be effected by every pound rise in the refrigerant suction pressure, with a corresponding rise in the refrigerant suction temperature, for every ton of frozen foods produced. From an economical operating standpoint, it is therefore obvious that the larger part of this heat removal should be accomplished at the highest possible temperature consistent with the optimum time required for freezing various foods. Lowering the temperature of the refrigerant or maintaining a greater temperature difference between the refrigerant and foods is found to be only one of the contributing factors which effects the rate of heat transfer or time required to freeze various foods. It is found that the numerous other factors and conditions herein disclosed are each equally important for the acceleration of heat transmission or reducing the time required for freezing various foods.

With full appreciation of the foregoing facts, the advantages gained by the arrangement embodied in the form of the invention shown in Figure 4 will at once be obvious. In addition to the multi-staging of the heat transfer required for cooling the recirculating air and multi-staging of the heat transfer required for freezing the foods as hereinbefore described in connection with the operation of the apparatus shown in Figures 1, 2 and 3, this form of the invention also provides for the direct application of multi-stage refrigerant compression with dual recirculated air temperatures as required for economically removing a large amount of the heat from the foods being treated at a relatively high refrigerant suction pressure with corresponding higher refrigerant temperature and recirculated air temperature. In addition to the reduction in the operating cost effected by utilizing a relatively high recirculated air temperature in the food prefreezing compartments 69 to 72 and a relatively low recirculated air temperature in the food freezing compartments 73 to 76, the quality and appearance of the finished frozen food is improved by further reducing the amount of moisture evaporation from the food during the refrigerating process, due to the existence of a smaller temperature difference between the recirculated air and the food in all refrigerating compartments and the effective control of this temperature difference by dampers 82a and 83a in the prefreezing and freezing compartments. Obviously this condition would also increase the weight of the finished frozen product due to the further reduction in food dehydration.

A desirable physical condition of each recirculated air stream in regard to its temperature and relative humidity is further effected by the sheet metal fan partitions 80a and 81a in the air recirculating fans 80 and 81, shown in Figure 4. It will be noted that partition 81a prevents the air recirculated through the prefreezing compartments 69 and 70 from mixing with the air recirculated through the prefreezing compartments 71 and 72. Likewise, partition 80a prevents the air recirculated through the freezing compartments 73 and 74 from mixing with the air recirculated through the freezing compartments 75 and 76. This separation of the air streams permits each recirculated air circuit to be maintained at a higher average relative humidity than would be possible if the two air streams mixed within the fans 80 and 81. Moreover, this arrangement permits each of the air streams to be maintained at a progressively higher temperature from the final freezing compartment 76 to the initial prefreezing compartment 69, while one refrigerant temperature is being maintained within all refrigerant heat transferring surfaces. Then an additional increase in the temperature of the recirculated air streams used for prefreezing as compared with the temperature of the recirculated air streams used for freezing may be effected by using dual refrigerant temperatures as hereinbefore described. It will be noted that the fan partitions 80a and 81a are applicable to the apparatus shown in Figures 1, 2, 3, 6, 7, 8 and 9, and in each instance effects a separation of recirculated air streams, which in turn establishes the difference in the physical condition of each recirculated air stream as hereinbefore described.

The operation of the apparatus shown in Figures 5, 6 and 7 in conjunction with any one of the refrigerating tube adaptors shown in Figures 10 to 25 is the same as hereinbefore described for the operation of the form of the invention shown in Figures 1 to 4. This form of the invention simply illustrates an economical arrangement when two refrigerating tubes are required to accommodate two different forms of adaptors shown in Figures 10 to 25 for simultaneously handling and refrigerating foods peculiarly suited to the different forms of adaptors. This apparatus also shows how the apparatus shown in Figures 1, 2, 3 and 4 may be installed in two sections where future extensions in capacity are contemplated and two refrigerating tubes are required. It will be noted that the food precooling compartment and four food freezing compartments in each refrigerating tube are of the same general arrangement as the food precooling compartment and first four food freezing compartments shown in the apparatus Figure 1, also as shown for food precooling compartment and four prefreezing compartments in Figure 4. Such an extension may be easily made by utilizing the food tempering compartments 114 and 115 as a compartment for refrigerant connections 78 as shown in Figures 1 and 4, and installing the additional four food freezing compartments and food tempering compartments with refrigerating heat transferring surfaces and connections. The food tempering compartment doors with frames as shown in Figure 5 would simply be removed and replaced in the food tempering compartments of the new extension. The automatic closing freezer doors 129 and 130 are adaptable to all forms of the invention, but are only used in conjunction with the form of refrigerating tube adaptor shown in Figures 24 and 25. This arrangement permits such adaptors to be discharged from the refrigerating tubes without the necessity of opening or closing the refrigerator doors on the discharge end of the refrigerating tubes. In the operation of the adaptors shown in Figures 10 to 21 in conjunction with the apparatus shown in Figures 5, 6 and 7, the adaptors are preferably constructed in one section, otherwise they are arranged in the refrigerating tube and operated in the same manner as hereinbefore described in connection with the operation of the apparatus shown in Figures 1, 2 and 3. Of course, the refrigerating tube doors 48 are in an open position when these adaptors are in use, which also applies to all other forms of refrigerating apparatus shown.

The operation of the apparatus shown in Figure 8 in conjunction with any of the refrigerating tube adaptors shown in Figures 10 to 25 is the same as hereinbefore described for the operation of the apparatus shown in Figures 1 to 7. This form of the invention is shown for the purpose of illustrating the general arrangement of the apparatus shown in Figures 5, 6 and 7, embodying only one refrigerating tube with adaptors shown in Figures 24 and 25 in position and forming the six separate refrigerating compartments 141 to 146, which consists of food precooling compartment 141, food freezing compartments 142 to 145 and food tempering compartment 146. This illustration also clearly shows how one unit of the apparatus shown in Figure 4 may be operated as a complete refrigerating unit within itself, wherein the treatment is applied to the foods in three steps, consisting of precooling, freezing and tempering, which is fully accomplished in six refrigerating stages.

The operation of the apparatus shown in Figure 9 in conjunction with any of the refrigerating tube adaptors shown in Figures 10 to 25 is the same as hereinbefore described for the operation of the apparatus shown in Figures 1 to 8. This form of the invention is shown for the purpose of illustrating the general arrangement of the apparatus similar to the one shown in Figures 5, 6 and 7, wherein the air recirculating fan 160 is located on top of the apparatus and discharges the recirculated air downwardly where it is divided into separate recirculated air streams each of which alternately pass through refrigerant heat transferring surfaces and food refrigerating tubes. The regulation of the recirculated air flow in each stream is accomplished by suitable regulation of the air dampers 162 and 163. The arrangement provided in this form of the invention permits the economical and simultaneous handling and refrigerating of several different kinds of food by using the different forms of adaptors shown in Figures 10 to 25 in the various refrigerating tubes. Changing of one form of adaptor to another form, as may be required for refrigerating a different kind of food, may be accomplished in the refrigerating tubes served by one recirculated air stream while all of the refrigerating tubes served by the other recirculated air streams are in operation. This may be quickly accomplished by setting air damper 162 in the position shown at 162a or 162b and setting the air damper 163 located on the side of the apparatus which coincides with the closed position of damper 162, in the position shown at 163a.

While general reference is made herein to freezing of foods, it is believed obvious that the refrigerating method, apparatus and handling facilities would be very effective for economically precooling fresh fruits, vegetables and the like before shipment, also for rapid and economical congealing or solidifying chemical substances and the like.

It will be noted that the refrigerating apparatus embodied in all forms of the invention include one or more refrigerating tubes for the reception of food handling facilities consisting of adaptors, wherein individual recirculated air compartments are formed with baffles, in which a desirable condition of control and refrigerating action can be readily and economically effected. While there are three forms of adaptors herein described and shown in the accompanying drawings, it is to be understood that the use of other forms of adaptors is contemplated as may be required for more efficient handling and refrigerating of certain foods. For example: The advantageous conditions resulting from freezing bread is now generally recognized by the baking industry. The handling and refrigerating of such commodities would be better suited to an adaptor embodying reticulated metal conveyor belts arranged in multiple, a form of which is shown and described in my co-pending application Serial No. 168,507. Likewise, certain food may be better suited to an adaptor embodying perforated metal plates or open mesh wire screens arranged in multiple, with foods placed thereon and conveyed through the refrigerating tube by vibration of the plates or screens. The arrangement, construction and application of such adaptors with baffles forming individual recirculating air compartments is obviously simple and therefore is believed to be well within the scope of the invention as herein described and shown in the accompanying drawings.

For general food refrigerating purposes the construction and arrangement of refrigerant heat transferring surfaces herein described and shown is considered to be preferable. However, in the application of refrigeration or in the freezing of piscatorial products the use of brine spray over such products is contemplated in conjunction with the recirculated air herein described. The brine, preferably a solution of sodium chloride and water of suitable density, may be distributed on the products by pipes extending along the top of the refrigerating tube with the brine falling by gravitational effect through the product handling adaptor and in contact with the product, finally collecting on the floor of the refrigerating tube which may be pitched to a brine pit where the brine may be repumped for a repetition of the brine circulating cycle. The brine may be cooled by a separate shell and tube brine cooler or by the recirculated air. The brine may also be cooled by distributing a part of the recirculated brine over the refrigerant heat transferring surfaces. In practicing this refrigerating method on marine vessels for refrigerating piscatorial products it would be desirable to omit the refrigerant heat transferring surfaces herein described in order to substantially reduce the weight of the refrigerating apparatus, and in place of such surfaces use brine sprays for cooling the recirculated air. The brine would be recirculated through a shell and tube type brine cooler and delivered to the brine spray chambers which would occupy the same space shown for the accommodation of the refrigerant heat transferring surfaces in the accompanying drawings. A part of the recirculated brine may be distributed directly on the product as before described. The recirculated air baffles and adaptor baffles would be arranged in the same manner as herein described and shown in the accompanying drawings, so as to multi-stage the heat transfer required for refrigerating the product and the heat transfer required for cooling the recirculated air.

From the disclosure, drawings and detailed description of the invention it is believed that the construction and operation thereof will at once be apparent, it being noted that there is herein provided a novel process of refrigerating foods and the like combined with facilities for handling containers and various kinds of foods. The method of applying the refrigerating effect being accomplished in steps and stages wherein certain desirable heat transfer conditions are established and maintained. While there are herein shown and described the preferred embodiments of the present invention, it is nevertheless to be understood that minor changes may be made therein without departing from the spirit and scope of the invention as claimed.

I claim:

1. A method of refrigerating material by successively removing fractional parts of the total heat required to be removed from the material; said method consisting of first subjecting the material to the convection currents of a body of air cooled by direct contact with refrigerated surfaces within an initial stage; thereafter progressively subjecting the material to heat exchange with air streams of progressively lower temperature, each stream being circulated through a continuous closed path separated from the path of each of the other streams and from said initial stage; and finally subjecting said material within a final stage to the convection currents of a body of refrigerated air cooled to a temperature lower than any of the air stream temperatures by direct contact with refrigerated surfaces.

2. A method of refrigerating material by successively removing fractional parts of the total heat required to be removed from the material; said method consisting of first subjecting the material to the convection currents of a body of air cooled by direct contact with refrigerated surfaces within an initial stage; thereafter moving the material progressively through other stages where it is subjected to heat exchange with air streams of progressively lower temperature, each stream being circulated through a continuous closed path separated from the path of each of the other streams and from said initial stage; and thereafter moving said material into a final stage where it is subjected to the convection currents of a body of refrigerated air cooled to a temperature lower than any of the air stream temperatures by direct contact with refrigerated surfaces.

3. A method of refrigerating material by successively removing fractional parts of the total heat required to be removed from the material; said method consisting of first subjecting the material to a body of refrigerated air within an initial cooling zone; thereafter progressively subjecting the material to heat exchange with air streams of progressively lower temperature and each circulated through a continuous closed path separated from the path of each of the other streams and from said initial zone and thereafter substantially fixing the condition of the material produced by the last air stream by subjecting said material to a body of refrigerated air within a separate and final refrigerating zone.

4. A method of refrigerating material by successively removing fractional parts of the total heat required to be removed from the material; said method consisting of first subjecting the material to a body of refrigerated air within an initial cooling zone, thereafter moving the material progressively through other zones where it is subjected to heat exchange with air streams of progressively lower temperature, each stream being circulated through a continuous closed path separated from the path of each of the other streams and from said initial zone; and thereafter moving said material into a final zone where it is subjected to a body of refrigerated air having a temperature lower than any of the air stream temperatures.

5. A method of refrigerating material by successively removing fractional parts of the total heat required to be removed from the material in a successive series of separate heat transfer zones; said method consisting of initially precooling the material by subjecting the same to a body of refrigerated air within the first zone; then freezing the material by subjecting the same to heat exchange with air streams of progressively lower temperature, each stream being circulated through a continuous closed path separated from the path of each of the other streams and from said first zone; and thereafter tempering the material by subjecting the same in a separate and final refrigerating zone to a body of air cooled to the lowest temperature encountered by the material in the practice of this method.

6. A method of refrigerating material by successively removing fractional parts of the total heat required to be removed from the material in a successive series of heat transfer zones; said method consisting of initially pre-cooling the material by subjecting it to a body of refrigerated air within the first zone; then moving the material progressively through other zones to freeze it and where it is subjected to heat exchange with air streams of progressively lower temperature, each stream being circulated through a continuous closed path separated from the path of each of the other streams and from said first zone; and thereafter moving said material into a final zone where it is subjected to a body of air separately cooled to the lowest temperature encountered by the material in the practice of this method.

7. A method of freezing foods and the like by first pre-cooling, then freezing and finally tempering the foods to a uniform temperature in a series of separate successive heat transfer zones; said method consisting of first subjecting the foods to a body of refrigerated air having a temperature above the freezing points of said foods within an initial refrigerated zone; thereafter progressively subjecting the foods to heat exchange with air streams of progressively lower temperature and below the freezing point of the foods and each circulating through a continuous closed path separated from the path of each of the other streams and said initial refrigerating zone, and finally subjecting the foods to a body of refrigerated air within the final refrigerating zone having a temperature below the temperature of any of the recirculated air streams.

8. A method of treating material by first pre-cooling, then pre-freezing, thereafter freezing and finally tempering the material; said method consisting of first subjecting the material to a body of refrigerated air within an initial stage cooled to a temperature above the freezing point of the material by an initial primary refrigerant; thereafter prefreezing the material by progressively subjecting the material to heat exchange with air streams of progressively lower temperatures, all cooled below the freezing point of the material by an initial primary refrigerant; thereafter freezing the material by progressively subjecting the material to heat exchange with other air streams of progressively lower temperatures cooled by a final primary refrigerant to a temperature lower than the temperature of any of the aforesaid air streams, each of said air streams being circulated through a continuous closed path separated from the path of each of the other streams and from said initial stage; and finally tempering the material by subjecting within a final heat transfer stage the material to a body of refrigerated air having a lower temperature than any of the aforesaid air streams.

9. A method of congealing liquid substance consisting of first subjecting the substance to a body of refrigerated air within an initial refrigerating zone; then congealing the substance by moving it along a predetermined path of travel in heat exchange with a current of air flowing through a temporarily closed path which crosses and re-crosses said path of travel and which includes refrigerating zones separated by said path of travel; thereafter subjecting the substance to heat exchange with air streams of progressively lower temperature and each circulated through a continuous path separated from the path of each of the other streams and from said initial refrigerating zone with the temperature of the air streams being below the congealing point of the substance being treated; and finally subjecting said substance to a body of refrigerated air within a final refrigerated zone.

10. A method of freezing material, consisting of precooling the material in the precooling section of a freezing tunnel by subjecting it to a body of refrigerated air; then advancing the material into and progressively along the freezing passage of said tunnel, said passage being crossed and re-crossed by streams of refrigerated air of progressively lower temperatures circulated in paths temporarily closed with respect to each other and each including a part of said passage and refrigerating zones separated by said passage; and then advancing the material into the tempering section of the tunnel, where it is subjected to a body of air having a temperature lower than any of the temperatures prevailing in the paths of the air streams.

11. A method of freezing material consisting of initially precooling the material to be frozen, thereafter progressively subjecting said material in horizontally moving layers to heat exchange with air streams of progressively lower temperatures and flowing obliquely across said layers and each circulating through a continuous closed path separated from the paths of each of the other streams with the air streams each having a temperature below the freezing point of the material and finally subjecting the material to a body of refrigerated air having a lower temperature than that of any of the air streams to effect a final refrigerating treatment of the material.

12. A method of refrigerating a sealed container enclosing a liquid material or partly liquid material and having a space therein unfilled by such material, said method consisting of subjecting the external surfaces of the container to the convection currents of a body of refrigerated air within an initial refrigerating zone, thereafter prefreezing the material in one stage by subjecting the container to heat exchange with air streams of progressively lower temperature and each circulated through a continuous closed path separated from the path of each of the other streams and from said initial zone, thereafter freezing the material in a second stage by subjecting the container to heat exchange with other air streams of progressively lower temperature than the temperatures in the first stage and each circulated through a continuous path separated from the path of each of the other streams and with temperatures below the freezing point of the material being treated, revolving said container throughout the progressive steps of the prefreezing and freezing treatments in both stages to form a desirable amount of air or vacuum space in the approximate center of the frozen mass and finally subjecting the container to the convection currents of the body of refrigerated air within a final refrigerating zone.

13. The combination with a casing comprising means forming a predetermined path of travel therethrough, of an adaptor including supports for food and provided with a plurality of spaced baffles and arranged to travel along said path, said casing also including means cooperating with the first mentioned means and said baffles to provide a precooling zone and a plurality of closed conduits for directing air across said adaptor, means cooperating with the first mentioned means to provide a final tempering zone, refrigerating apparatus comprising cooling coils extending through the precooling zone, said closed conduits and the final tempering zone, and means for propelling air through said closed conduits.

14. A device for freezing material comprising a housing, having cooling coils therein, portable food handling mechanism within the housing to receive the material to be refrigerated and for guiding and conveying the material through the housing, and cooperating devices carried by the housing and portable food handling mechanism for forming therewith conduits, each temporarily substantially closed from the other conduits, said device including means for circulating a refrigerating medium through said closed conduits for cooling the material in a plurality of stages and harvesting facilities for the removal of the refrigerated material.

15. The combination with a refrigerating cabinet having air cooling surfaces, of portable food handling mechanism associated therewith to receive the materials to be refrigerated and for guiding and conveying the materials through the refrigerating cabinet, cooperating devices carried by the refrigerating cabinet and the food handling mechanism for forming closed recirculating air passages separated from each other and each including a plurality of compartments, means in certain of said compartments for refrigerating said surfaces, means for circulating air, said passages with their compartments being so arranged with respect to said refrigerating means that the air circulating in each passage moves successively across a refrigerating means and material on said mechanism and means for harvesting the treated material from the cabinet.

16. In refrigerating apparatus, a closed housing, heat transferring means including surfaces arranged in said housing to provide a travel path for materials to be refrigerated, oppositely disposed vertical air baffles arranged at opposite sides of said travel path, means for support of materials to be refrigerated movable through the travel path, baffles carried by said means cooperating with said housing and the adjacent baffles in said housing to provide successive heat transfer chambers and temporarily closed circuitous air paths passing through said chambers, and means for recirculating air through the circuitous paths over the heat transferring surfaces and the materials in said heat transfer chambers to be refrigerated.

17. Refrigerating apparatus as set forth in claim 16, wherein the heat transferring surfaces are arranged to provide a pair of parallel travel paths for the materials to be refrigerated.

18. Refrigerating apparatus as set forth in claim 16, wherein a precooling chamber and a tempering chamber are respectively arranged at the inlet and outlet ends of the travel path.

19. Refrigerating apparatus as set forth in claim 16, wherein a precooling chamber and a tempering chamber are respectively arranged at the inlet and outlet ends of the travel path, the intermediate portion of the travel path constituting a freezing chamber and the heat transferring surfaces being arranged whereby the recirculated air contacts at least two spaced portions of the heat transferring surfaces before passing through the freezing chamber of the travel path.

20. Refrigerating apparatus as set forth in claim 16, wherein a precooling chamber and a tempering chamber are arranged respectively at the inlet and outlet ends of the travel path, the travel path between the precooling and tempering chambers constituting prefreezing and freezing chambers respectively adjacent the precooling and tempering chambers and the heat transferring surfaces being arranged whereby the recirculated air contacts at least two spaced portions of the heat transferring surfaces before passing through the prefreezing and freezing chambers.

21. Refrigerating apparatus as set forth in claim 16, wherein means is provided for moving the material supporting means in a step-by-step movement, the supporting means for the materials to be refrigerated being of a construction to effect movements of the materials during step-by-step movements of said supporting means through the travel path, the cooperating baffles forming the heat transfer chambers when said supporting means is at rest.

22. Refrigerating apparatus as set forth in claim 16, wherein the material supporting means comprises a rack and track guides in the travel path for the rack.

23. A refrigerating device comprising refrigerant heat transferring surfaces and a housing arranged to form refrigerating tubes, portable food handling adaptors in said tubes, said surfaces, housing and adaptors having cooperative devices for forming multiple recirculating air passages including multiple refrigerating compartments within the refrigerating tubes, said adaptors having adjustable air baffles for distributing a desirable quantity of air through the material being treated and mechanism cooperative with a conveyor for harvesting the individual adaptors with treated material.

24. In refrigerating apparatus, a closed housing, heat transferring surfaces arranged in said housing to provide a travel path for materials to be refrigerated, oppositely disposed vertical air baffles associated with the heat transferring surfaces at opposite sides of said travel path, means for the support of materials to be refrigerated movable through the travel path, baffles carried by said means cooperating with the aforesaid baffles and housing to provide temporarily closed circuitous air paths including adjacent prefreezing and freezing chambers in said travel path, and separate means for recirculating separate air streams respectively through the prefreezing and freezing chambers of the travel path and over the heat transferring surfaces.

WILLIAM J. FINNEGAN.